United States Patent
Stefanski et al.

(10) Patent No.: US 9,470,430 B2
(45) Date of Patent: *Oct. 18, 2016

(54) PRECONDITIONING CONTROLS AND METHODS FOR AN ENVIRONMENTAL CONTROL SYSTEM

(71) Applicant: Google Inc., Mountain View, CA (US)

(72) Inventors: Mark Stefanski, Palo Alto, CA (US); Yoky Matsuoka, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 286 days.

This patent is subject to a terminal disclaimer.

(21) Appl. No.: 14/155,225

(22) Filed: Jan. 14, 2014

(65) Prior Publication Data
US 2014/0129034 A1    May 8, 2014

Related U.S. Application Data

(63) Continuation of application No. 13/632,150, filed on Sep. 30, 2012, now Pat. No. 8,630,742.

(51) Int. Cl.
| | |
|---|---|
| *F24F 11/00* | (2006.01) |
| *H05B 1/02* | (2006.01) |
| *G06F 1/32* | (2006.01) |
| *G05D 23/19* | (2006.01) |

(52) U.S. Cl.
CPC ........ *F24F 11/0086* (2013.01); *F24F 11/0012* (2013.01); *G05D 23/1904* (2013.01); *G05D 23/1917* (2013.01); *G06F 1/3293* (2013.01); *H05B 1/028* (2013.01); *Y02B 60/121* (2013.01)

(58) Field of Classification Search
None
See application file for complete search history.

(56) References Cited

U.S. PATENT DOCUMENTS

| | | |
|---|---|---|
| 4,223,831 A | 9/1980 | Szarka |
| 4,335,847 A | 6/1982 | Levine |
| 4,685,614 A | 8/1987 | Levine |

(Continued)

FOREIGN PATENT DOCUMENTS

| | | |
|---|---|---|
| CA | 2202008 | 2/2000 |
| EP | 1 960 69 | 12/1991 |

(Continued)

OTHER PUBLICATIONS

International Preliminary Report on Patentability issued Mar. 31, 2015 for International Patent Application No. PCT/US2012/058209 filed Sep. 30, 2012, all pages.

(Continued)

*Primary Examiner* — Sean Shechtman
(74) *Attorney, Agent, or Firm* — Kilpatrick Townsend & Stockton LLP

(57) ABSTRACT

A method of preconditioning an enclosure includes providing a thermostat and computing a set of preconditioning criteria information (PCI) with the thermostat. The computed PCI is typically representative of time and ambient temperature conditions for which preconditioning should be performed. The PCI may be stored in memory and used to compare against a current time and current ambient temperature condition of the enclosure to determine whether to enter the thermostat into a preconditioning state. If a determination is made that the PCI criteria are satisfied, the thermostat may be entered into the preconditioning state to heat or cool the enclosure. One or more of these processes may be performed while a processor of the thermostat is in a relatively high power mode or relatively low power mode.

28 Claims, 16 Drawing Sheets

(56) References Cited

U.S. PATENT DOCUMENTS

| | | |
|---|---|---|
| 4,751,961 A | 6/1988 | Levine et al. |
| 5,088,645 A | 2/1992 | Bell |
| 5,203,497 A | 4/1993 | Ratz et al. |
| 5,211,332 A | 5/1993 | Adams |
| 5,240,178 A | 8/1993 | Dewolf et al. |
| 5,395,042 A | 3/1995 | Riley et al. |
| 5,454,511 A | 10/1995 | Van Ostrand et al. |
| 5,476,221 A | 12/1995 | Seymour |
| 5,555,927 A | 9/1996 | Shah |
| 5,611,484 A | 3/1997 | Uhrich |
| 5,902,183 A | 5/1999 | D'Souza |
| 5,909,378 A | 6/1999 | De Milleville |
| 5,927,599 A | 7/1999 | Kath |
| 5,977,964 A | 11/1999 | Williams et al. |
| 6,062,482 A | 5/2000 | Gauthier et al. |
| 6,098,893 A | 8/2000 | Berglund et al. |
| 6,216,956 B1 | 4/2001 | Ehlers et al. |
| 6,349,883 B1 | 2/2002 | Simmons et al. |
| 6,645,066 B2 | 11/2003 | Gutta et al. |
| 6,769,482 B2 | 8/2004 | Wagner et al. |
| 7,024,336 B2 | 4/2006 | Salsbury et al. |
| RE40,437 E | 7/2008 | Rosen |
| 7,469,550 B2 | 12/2008 | Chapman, Jr. et al. |
| 7,644,869 B2 | 1/2010 | Hoglund et al. |
| 7,784,704 B2 | 8/2010 | Harter |
| 7,802,618 B2 | 9/2010 | Simon et al. |
| 7,854,389 B2 | 12/2010 | Ahmed |
| 8,090,477 B1 | 1/2012 | Steinberg |
| 8,630,742 B1 | 1/2014 | Stefanski et al. |
| 2004/0133314 A1 | 7/2004 | Ehlers et al. |
| 2004/0249479 A1 | 12/2004 | Shorrock |
| 2005/0128067 A1 | 6/2005 | Zakrewski |
| 2005/0189429 A1 | 9/2005 | Breeden |
| 2006/0186214 A1 | 8/2006 | Simon et al. |
| 2006/0196953 A1 | 9/2006 | Simon et al. |
| 2008/0015742 A1 | 1/2008 | Kulyk et al. |
| 2008/0191045 A1 | 8/2008 | Harter |
| 2008/0317292 A1 | 12/2008 | Baker et al. |
| 2009/0171862 A1 | 7/2009 | Harrod et al. |
| 2010/0010678 A1* | 1/2010 | Dawson ............... F24F 11/0009 700/276 |
| 2010/0019051 A1 | 1/2010 | Rosen |
| 2010/0025483 A1 | 2/2010 | Hoeynck et al. |
| 2010/0070084 A1 | 3/2010 | Steinberg et al. |
| 2010/0070086 A1 | 3/2010 | Harrod et al. |
| 2010/0070234 A1 | 3/2010 | Steinberg et al. |
| 2010/0084482 A1 | 4/2010 | Kennedy et al. |
| 2010/0121494 A1 | 5/2010 | Ma et al. |
| 2010/0211224 A1 | 8/2010 | Keeling et al. |
| 2010/0262298 A1 | 10/2010 | Johnson et al. |
| 2010/0280667 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0185895 A1 | 8/2011 | Freen |
| 2012/0085831 A1 | 4/2012 | Kopp |

FOREIGN PATENT DOCUMENTS

| | | |
|---|---|---|
| JP | 59-106311 | 6/1984 |
| JP | 01-252850 | 10/1989 |
| WO | 2014/051635 | 4/2014 |

OTHER PUBLICATIONS

U.S. Appl. No. 13/632,150, Notice of Allowance mailed on Jan. 4, 2013, 21 pages.
U.S. Appl. No. 13/632,150, Notice of Allowance mailed on May 17, 2013, 21 pages.
U.S. Appl. No. 13/632,150, Notice of Allowance mailed on Sep. 6, 2013, 6 pages.
International Application No. PCT/US2012/058209, International Search Report and Written Opinion mailed on Dec. 26, 2012, 20 pages.
Aprilaire Electronic Thermostats Model 8355 User's Manual, Research Products Corporation, Dec. 2000, 16 pages.
Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Ecobee, retrieved from https://www.ecobee.com/solutions/home/smart-si/[retrieved on Feb. 25, 2013], Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc, Apr. 2001, 44 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers, Apr. 15, 2010, 8 pages.

(56) References Cited

OTHER PUBLICATIONS

White Rodgers (Emerson) Model IF98EZ-1621 Homeowner's User Guide, White Rodgers, Jan. 25, 2012, 28 pages.

Deleeuw, Ecobee WiFi Enabled Smart Thermostat Part 2: The Features Review, retrieved from http://www.homenetworkenabled.com/content.php?136-ecobee-WiFi-enabled-Smart-Thermostat-Part-2-The-Features-review [retrieved on Jan. 8, 2013], Dec. 2, 2011, 5 pages.

Gao et al., The Self-Programming Thermostat: Optimizing Setback Schedules Based on Home Occupancy Patterns, Proceedings of the First ACM Workshop on Embedded Sensing Systems for Energy-Efficiency in Buildings, Association for Computing Machinery, Nov. 2009, pp. 67-72.

Loisos et al., Buildings End-Use Energy Efficiency: Alternatives to Compressor Cooling, California Energy Commission, Public Interest Energy Research, Jan. 2000, 80 pages.

Lu et al., The Smart Thermostat: Using Occupancy Sensors to Save Energy in Homes, In Proceedings of the 8th ACM Conference on Embedded Networked Sensor Systems, Nov. 3-5, 2010, pp. 211-224.

* cited by examiner

PRECONDITIONING CONTROLS AND METHODS FOR AN ENVIRONMENTAL CONTROL SYSTEM

CROSS-REFERENCES TO RELATED APPLICATIONS

This application is a continuation of U.S. patent application Ser. No. 13/632,150, filed on Sep. 30, 2012, commonly assigned and hereby incorporated by reference in its entirety herein for all purpose.

TECHNICAL FIELD

This patent specification relates to systems and methods for preconditioning enclosures, such as homes. More particularly, this patent specification relates to control units that govern the operation of energy-consuming systems, household devices, or other resource-consuming systems, including methods for thermostats that perform preconditioning operations of heating, ventilation, and air conditioning (HVAC) systems.

BACKGROUND OF THE INVENTION

Substantial effort and attention continue toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment.

As discussed in the technical publication No. 50-8433, entitled "Power Stealing Thermostats" from Honeywell (1997), early thermostats used a bimetallic strip to sense temperature and respond to temperature changes in the room. The movement of the bimetallic strip was used to directly open and close an electrical circuit. Power was delivered to an electromechanical actuator, usually relay or contactor in the HVAC equipment whenever the contact was closed to provide heating and/or cooling to the controlled space. Since these thermostats did not require electrical power to operate, the wiring connections were very simple. Only one wire connected to the transformer and another wire connected to the load. Typically, a 24 VAC power supply transformer, the thermostat, and 24 VAC HVAC equipment relay were all connected in a loop with each device having only two required external connections.

When electronics began to be used in thermostats, the fact that the thermostat was not directly wired to both sides of the transformer for its power source created a problem. This meant that the thermostat had to be hardwired directly from the system transformer. Direct hardwiring a common "C" wire from the transformer to the electronic thermostat may be very difficult and costly.

Because many households do not have a direct wire from the system transformer (such as a "C" wire), some thermostats have been designed to derive power from the transformer through the equipment load. The methods for powering an electronic thermostat from the transformer with a single direct wire connection to the transformer are called "power stealing" or "power sharing" methods. The thermostat "steals," "shares," or "harvests" its power during the "OFF" periods of the heating or cooling system by allowing a small amount of current to flow through it into the load coil below the load coil's response threshold (even at maximum transformer output voltage). During the "ON" periods of the heating or cooling system the thermostat draws power by allowing a small voltage drop across itself. Ideally, the voltage drop will not cause the load coil to dropout below its response threshold (even at minimum transformer output voltage). Examples of thermostats with power stealing capability include the Honeywell T8600, Honeywell T8400C, and the Emerson Model 1F97-0671. However, these systems do not have power storage means and therefore must always rely on power stealing.

Additionally, microprocessor controlled "intelligent" thermostats may have more advanced environmental control capabilities that can save energy while also keeping occupants comfortable, such as by "preconditioning" (i.e., preheating or precooling) a space. To do this, these thermostats require more information from the occupants as well as the environments where the thermostats are located. These thermostats may also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities that may require network connectivity.

Issues arise in relation to providing microprocessor-controlled thermostats using high-powered user interfaces, one or more such issues being at least partially resolved by one or more of the embodiments described herein below. On the one hand, it is desirable to provide a thermostat having advanced functionalities such as those associated with relatively powerful microprocessors and reliable wireless communications chips, which functionalities include, among other things, preconditioning a space. On the other hand, it is desirable to provide a thermostat that is compatible and adaptable for installation in a wide variety of homes, including a substantial percentage of homes that are not equipped with the "C" wire discussed above. It is still further desirable to provide such a thermostat that accommodates easy do-it-yourself installation such that the expense and inconvenience of arranging for an HVAC technician to visit the premises to install the thermostat can be avoided for a large number of users. It is still further desirable to provide a thermostat having such processing power, wireless communications capabilities, visually pleasing display qualities, and other advanced functionalities, while also being a thermostat that, in addition to not requiring a "C" wire, likewise does not need to be plugged into a household line current or a so-called "power brick," which can be inconvenient for the particular location of the thermostat as well as unsightly. Therefore, improvements are needed in the art.

BRIEF SUMMARY OF THE INVENTION

Embodiments of the invention describe system, apparatus, and methods for preconditioning an ambient temperature of an enclosure, such as a home. The embodiments may be particularly useful and effective on energy limited devices, such as thermostats operating without a common "C" wire. The embodiments deliver a powerful and energy conscious solution to preconditioning enclosures. According to one aspect, a thermostat that is useful in preconditioning an enclosure is provided. The thermostat may include a housing, memory, and a processing system disposed within the housing. The processing system may be in operative communication with one or more temperature sensors to determine an ambient temperature and in operative communication with a heating, ventilation, and air conditioning (HVAC) system to control the ambient temperature according to an HVAC schedule stored in the memory. The HVAC schedule may include a first setpoint characterized by a first setpoint temperature and a first setpoint time and a second setpoint characterized by a second setpoint temperature and a second setpoint time. The first setpoint time and second setpoint time may define a first time interval therebetween.

The processing system may be configured to control the HVAC system to precondition the enclosure during at least a part of the first time interval such that the ambient temperature reaches substantially the second setpoint temperature by the second setpoint time. The processing system may include a first processor characterized by at least a relatively high electrical power-consuming first mode of operation and a relatively low electrical power-consuming second mode of operation.

During said first time interval, the first processor may enter into the first mode of operation to process the second setpoint temperature in conjunction with first information derived from a historical record stored in the memory of previous heating and cooling cycles for the HVAC system as controlled by the thermostat to compute a set of preconditioning criteria information (PCI) representative of time and ambient temperature conditions for which the preconditioning should be performed. The set of PCI may be stored in the memory. Subsequent to storing the set of PCI in the memory, the first processor may enter into the second mode of operation. While in the second mode of operation, a current time and current ambient temperature may be compared against the PCI to determine whether to enter into a preconditioning state. The first processor may then enter into the first mode of operation and the thermostat may be entered into the preconditioning state upon a determination that the PCI criteria are satisfied.

In some embodiments, the set of PCI may be computed based on a time to temperature for the enclosure that defines a change in temperature response for the enclosure when subjected to a heating or cooling operation. The time to temperature for the enclosure may be adjusted for a subsequent preconditioning operation based on a response of the enclosure to the preconditioning. The response may be stored in the memory and included in the historical record of previous heating and cooling cycles.

In some embodiments, the processing system may also include a second processor characterized by a relatively low electrical power-consuming mode of operation. The set of PCI may be communicated to the second processor prior to the first processor entering into the second mode of operation. In some embodiments, the set of PCI may be computed via the first processor each time the first processor enters into the first mode of operation and the set of PCI may be communicated to the second processor prior to the first processor entering into the second mode of operation. In some embodiments, communicating the set of PCI to the second processor may include communicating a partial set of the set of PCI. The partial set may covering a time interval extending to either of: 1) an anticipated or requested time of the first processor entering into the first mode of operation, and 2) the second setpoint time.

In some embodiments, comparing the current time and current ambient temperature against the PCI to determine whether to enter into the preconditioning state may include determining an amount of time relative to the first processor entering into the second mode of operation; determining an ambient temperature condition of the PCI associated with the amount of time where the ambient temperature condition represent a temperature for which preconditioning should be performed; and comparing the current ambient temperature with the ambient temperature condition to determine whether the PCI criteria are satisfied. In some embodiments, processing the second setpoint temperature in conjunction with the first information to compute the set of PCI may include: determining a first time duration defined by the second setpoint time and a first time within the first time interval; deriving from the historical record, a first ambient temperature condition associated with the first time duration that represents a temperature for which preconditioning should be performed; determining a second time duration defined by the first time and a second time within the first time interval; deriving from the historical record, a second ambient temperature condition associated with the second time duration that represents an additional temperature for which preconditioning should be performed; determining at least one addition time duration within the first time interval; and deriving at least one additional ambient temperature condition representative of at least one additional temperature for which preconditioning should be performed.

In some embodiments, the set of PCI may include an upper range representative of conditions for which a preconditioning cooling operation should be performed, a lower range representative of conditions for which a preconditioning heating operation should be performed, or both. In some embodiments, the set of PCI may be a step function. In some embodiments, preconditioning may be limited to a defined duration, such as 1 hour.

According to another aspect, a method of preconditioning an enclosure is provided. According to the method, a thermostat may be provided. The thermostat may include a housing, memory, and a processing system disposed within the housing. The processing system may be in operative communication with one or more temperature sensors to determine an ambient temperature and in operative communication with a heating, ventilation, and air conditioning (HVAC) system to control the ambient temperature according to an HVAC schedule stored in the memory. The HVAC schedule may include a first setpoint characterized by a first setpoint temperature and a first setpoint time and a second setpoint characterized by a second setpoint temperature and a second setpoint time. The first setpoint time and second setpoint time may define a first time interval therebetween.

The processing system may be configured to control the HVAC system to precondition the enclosure during at least a part of the first time interval such that the ambient temperature reaches substantially the second setpoint temperature by the second setpoint time. The processing system may include a first processor characterized by at least a relatively high electrical power-consuming first mode of operation and a relatively low electrical power-consuming second mode of operation. According to the method, during the first time interval, the first processor may enter into the first mode of operation to process the second setpoint temperature in conjunction with first information derived from a historical record stored in the memory of previous heating and cooling cycles for the HVAC system as controlled by the thermostat to compute a set of preconditioning criteria information (PCI) representative of time and ambient temperature conditions for which the preconditioning should be performed. According to the method, the set of PCI may be stored in the memory. According to the method, subsequent to storing the set of PCI in the memory, the first processor may enter into the second mode of operation. According to the method, while in the second mode of operation, a current time and current ambient temperature may be compared against the PCI to determine whether to enter the thermostat into a preconditioning state. According to the method, the first processor may be entered into the first mode of operation and the thermostat may be entered into the preconditioning state upon a determination that the PCI criteria are satisfied.

According to another aspect, a thermostat is provided. The thermostat may include a housing, memory, and a processing system disposed within the housing as described herein and for similar reasons to those described herein. According to one embodiment, during a first time interval a first processor of the processing system in a first mode of operation (e.g., a relatively high power-consuming mode) may process a second setpoint temperature in conjunction with first information derived from a historical record stored in the memory of previous heating and cooling cycles for the HVAC system as controlled by the thermostat to compute a set of preconditioning criteria information (PCI) representative of time and ambient temperature conditions for which the preconditioning should be performed. The set of PCI may then be communicated to a second processor of the processing system having a relatively low power-consuming mode of operation.

Subsequent to communicating the set of PCI to the second processor, the first processor may enter into a second mode of operation (e.g., a relatively low power-consuming mode). The second processor may then compare a current time and current ambient temperature against the set of PCI to determine whether to enter the thermostat into a preconditioning state. The first processor may then be entered into the first mode of operation based on information transmitted by the second processor and the thermostat may be entered into the preconditioning state upon a determination that the PCI criteria are satisfied.

According to another aspect, a method of preconditioning an enclosure is provided. According to the method, a thermostat may be provided. The thermostat may include a housing, memory, and a processing system disposed within the housing as described herein and for similar reasons to those described herein. The method may include entering a first processor of the processing system into a first mode of operation (e.g., a relatively high power-consuming mode) to process a second setpoint temperature in conjunction with first information derived from a historical record stored in the memory of previous heating and cooling cycles for the HVAC system as controlled by the thermostat to compute a set of preconditioning criteria information (PCI) representative of time and ambient temperature conditions for which the preconditioning should be performed.

The method may also include communicating the set of PCI to a second processor of the processing system, the second processor having a relatively low power-consuming mode of operation. The method may further include, subsequent to communicating the set of PCI to the second processor, entering the first processor into a second mode of operation (e.g., a relatively low power-consuming mode). The method may additionally include, while in the second mode of operation, comparing with the second processor a current time and current ambient temperature against the set of PCI to determine whether to enter the thermostat into a preconditioning state. The method may additionally include entering the first processor into the first mode of operation and entering the thermostat into the preconditioning state upon a determination that the PCI criteria are satisfied.

DETAILED DESCRIPTION OF THE INVENTION

Figure 1:
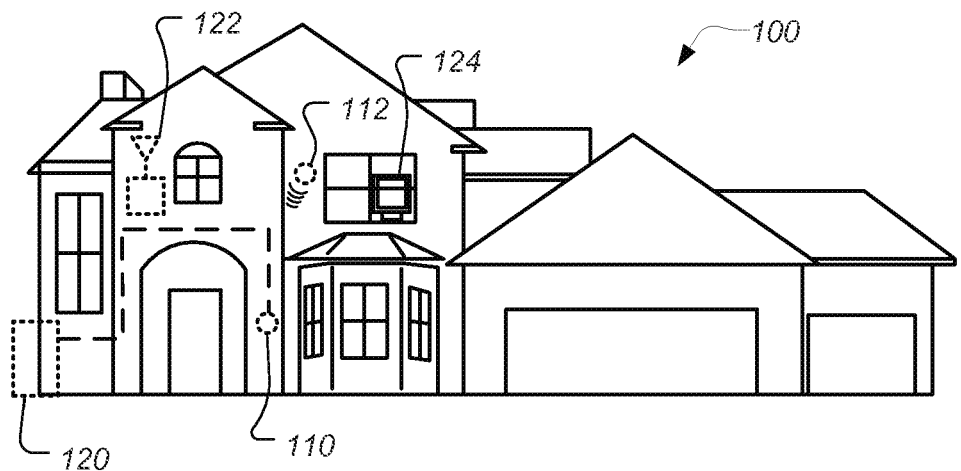
FIG. 1 is a diagram of an enclosure with an HVAC system, according to some embodiments.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure. The subject matter of the instant disclosure is related to the subject matter of the following commonly assigned applications, each of which is incorporated by reference herein: U.S. Prov. Ser. No. 61/550,343 filed Oct. 21, 2011; U.S. Prov. Ser. No. 61/550,346 filed Oct. 21, 2011; International Application Ser. No. PCT/US12/00007 filed Jan. 3, 2012; U.S. Ser. No. 13/467,025 filed May 8, 2012; U.S. Ser. No. 13/632,093 filed Sep. 30, 2012 and entitled, "Intelligent Controller For An Environmental Control System"; U.S. Ser. No. 13/632,028 filed Sep. 30, 2012 and entitled, "Intelligent Controller Providing Time to Target State"; U.S. Ser. No. 13/632,041 filed Sep. 30, 2012 and entitled, "Automated Control-Schedule Acquisition Within An Intelligent Controller"; U.S. Ser. No. 13/632,070 filed Sep. 30, 2012 and entitled, "Automated Presence Detection and Presence-Related Control Within An Intelligent Controller"; U.S. Ser. No. 13/632,148 filed Sep. 30, 2012 and entitled, "HVAC Controller With User-Friendly Installation Features Facilitating Both Do-It-Yourself and Professional Installation Scenarios"; and U.S. Ser. No. 13/632,152 filed Sep. 30, 2012 and entitled, "Radiant Heating Controls and Methods for an Environmental Control System".

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

It is to be appreciated that while one or more embodiments are described further herein in the context of typical HVAC system used in a residential home, such as single-family residential home, the scope of the present teachings is not so limited. More generally, thermostats according to one or more of the preferred embodiments are applicable for a wide variety of enclosures having one or more HVAC systems including, without limitation, duplexes, townhomes, multi-unit apartment buildings, hotels, retail stores, office buildings and industrial buildings. Further, it is to be appreciated that while the terms user, customer, installer, homeowner, occupant, guest, tenant, landlord, repair person, and the like may be used to refer to the person or persons who are interacting with the thermostat or other device or user interface in the context of one or more scenarios described herein, these references are by no means to be considered as limiting the scope of the present teachings with respect to the person or persons who are performing such actions.

Provided according to one or more embodiments are systems, methods, computer program products, and related business methods for controlling one or more HVAC systems based on one or more versatile sensing and control units (VSCU units), each VSCU unit being configured and adapted to provide sophisticated, customized, energy-saving HVAC control functionality while at the same time being visually appealing, non-intimidating, elegant to behold, and delightfully easy to use. The term "thermostat" is used hereinbelow to represent a particular type of VSCU unit (Versatile Sensing and Control) that is particularly applicable for HVAC control in an enclosure. Although "thermostat" and "VSCU unit" may be seen as generally interchangeable for the contexts of HVAC control of an enclosure, it is within the scope of the present teachings for each of the embodiments hereinabove and hereinbelow to be applied to VSCU units having control functionality over measurable characteristics other than temperature (e.g., pressure, flow rate, height, position, velocity, acceleration, capacity, power, loudness, brightness) for any of a variety of different control systems involving the governance of one or more measurable characteristics of one or more physical systems, and/or the governance of other energy or resource consuming systems such as water usage systems, air usage systems, systems involving the usage of other natural resources, and systems involving the usage of various other forms of energy.

FIG. 1 is a diagram illustrating an exemplary enclosure using a thermostat 110 implemented in accordance with the present invention for controlling one or more environmental conditions. For example, enclosure 100 illustrates a single-family dwelling type of enclosure using a learning thermostat 110 (also referred to for convenience as "thermostat 110") for the control of heating and cooling provided by an HVAC system 120. Alternate embodiments of the present invention may be used with other types of enclosures including a duplex, an apartment within an apartment building, a light commercial structure such as an office or retail store, or a structure or enclosure that is a combination of these and other types of enclosures.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 readily fits with almost any décor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule (see FIG. 10) based on at least one automatically sensed event and/or at least one past or current user input.

As used herein, a "primary" thermostat refers to a thermostat that is electrically connected to actuate all or part of an HVAC system, such as by virtue of electrical connection to HVAC control wires (e.g. W, G, Y, etc.) leading to the HVAC system.

As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat.

In one particularly useful scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Each device is assigned a private network address from the integrated router 122 either dynamically through a service like Dynamic Host Configuration Protocol (DHCP) or statically through actions of a network administrator. These private network addresses may be used to allow the devices to communicate with each directly over the LAN. Other embodiments may instead use multiple discrete switches, routers and other devices (not shown) to perform more other networking functions in addition to functions as provided by integrated router 122.

Integrated router 122 further provides network devices access to a public network, such as the Internet, provided enclosure 100 has a connection to the public network generally through a cable-modem, DSL modem and an Internet service provider or provider of other public network service. Public networks like the Internet are sometimes referred to as a Wide-Area Network or WAN. In the case of the Internet, a public address is assigned to a specific device allowing the device to be addressed directly by other devices on the Internet. Because these public addresses on the Internet are in limited supply, devices and computers on the private network often use a router device, like integrated router 122, to share a single public address through entries in Network Address Translation (NAT) table. The router makes an entry in the NAT table for each communication channel opened between a device on the private network and a device, server, or service on the Internet. A packet sent from a device on the private network initially has a "source" address containing the private network address of the sending device and a "destination" address corresponding to the public network address of the server or service on the Internet. As packets pass from within the private network through the router, the router replaces the "source" address with the public network address of the router and a "source port" that references the entry in the NAT table. The server on the Internet receiving the packet uses the "source" address and "source port" to send packets back to the router on the private network which in turn forwards the packets to the proper device on the private network doing a corresponding lookup on an entry in the NAT table.

Entries in the NAT table allow both the computer device 124 and the thermostat 110 to establish individual communication channels with a thermostat management system (not shown) located on a public network such as the Internet. In accordance with some embodiments, a thermostat management account on the thermostat management system enables a computer device 124 in enclosure 100 to remotely access thermostat 110. The thermostat management system passes information from the computer device 124 over the Internet and back to thermostat 110 provided the thermostat management account is associated with or paired with thermostat 110. Accordingly, data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network where the thermostat management system and thermostat management account may be accessed. Further details on accessing the public network, such as the Internet, and remotely accessing a thermostat like thermostat 110 in accordance with embodiments of the present invention is described in further detail later herein.

In some embodiments, thermostat 110 may wirelessly communicate with remote thermostat 112 over the private network or through an ad hoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

Figure 2:
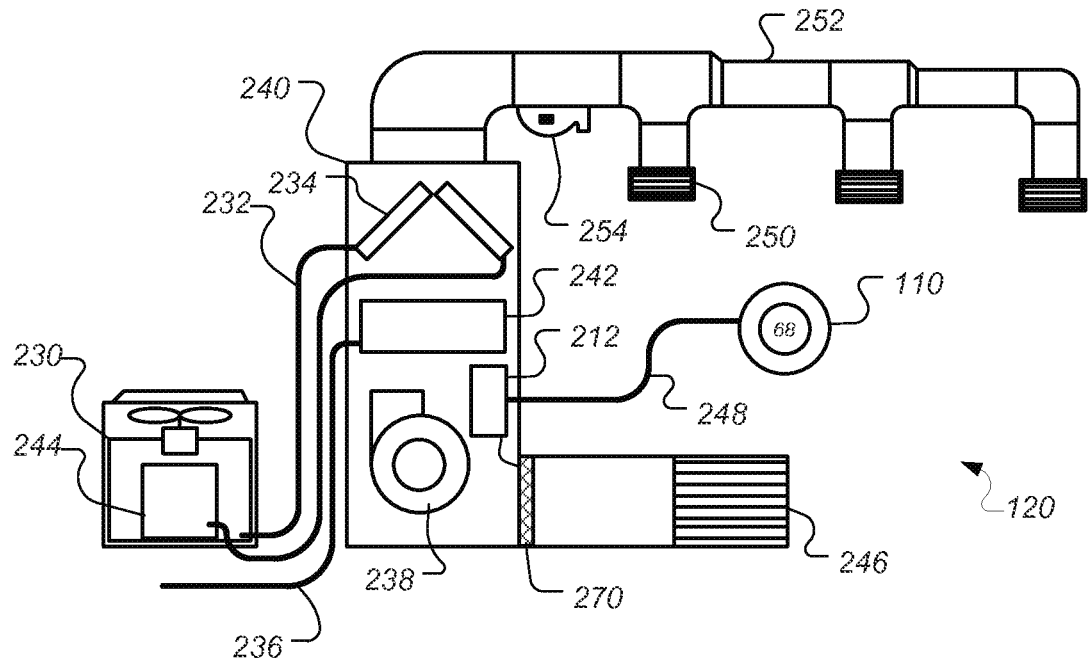
FIG. 2 is a diagram of an HVAC system, according to some embodiments.

FIG. 2 is a schematic diagram of an HVAC system controlled using a thermostat designed in accordance with embodiments of the present invention. HVAC system 120 provides heating, cooling, ventilation, and/or air handling for an enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils 244 to cool the gas. The gas then goes through line 232 to the cooling coils 234 in the air handler 240 where it expands, cools, and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Exemplary Thermostat Embodiments

Figure 3:
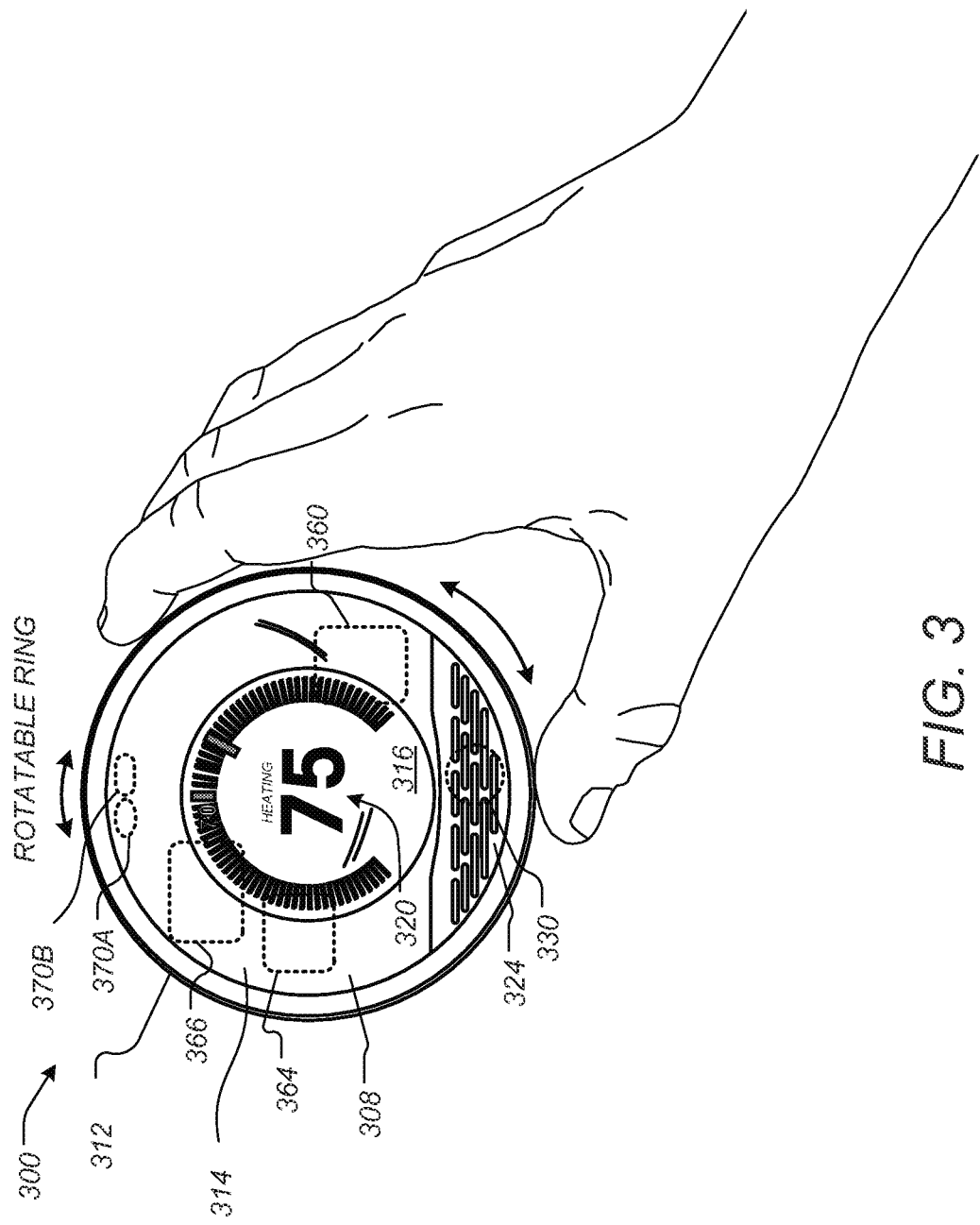
FIG. 3 illustrates a perspective view of a thermostat, according to one embodiment.

FIGS. 3-7 and the descriptions in relation thereto provide exemplary embodiments of thermostat hardware and/or software that can be used to implement the specific embodiments of the appended claims. This thermostat hardware and/or software is not meant to be limiting, and is presented to provide an enabling disclosure. FIG. 3 illustrates a perspective view of a thermostat 300, according to one embodiment. In this specific embodiment, the thermostat 300 can be controlled by at least two types of user input, the first being a rotation of the outer ring 312, and the second being an inward push on an outer cap 308 until an audible and/or tactile "click" occurs. As used herein, these two types of user inputs, may be referred to as "manipulating" the thermostat. In other embodiments, manipulating the thermostat may also include pressing keys on a keypad, voice recognition commands, and/or any other type of input that can be used to change or adjust settings on the thermostat 300.

For this embodiment, the outer cap 308 can comprise an assembly that includes the outer ring 312, a cover 314, an electronic display 316, and a metallic portion 324. Each of these elements, or the combination of these elements, may be referred to as a "housing" for the thermostat 300. Simultaneously, each of these elements, or the combination of these elements, may also form a user interface. The user interface may specifically include the electronic display 316. In FIG. 3, the user interface 316 may be said to operate in an active display mode. The active display mode may include providing a backlight for the electronic display 316. In other embodiments, the active display mode may increase the intensity and/or light output of the electronic display 316 such that a user can easily see displayed settings of the thermostat 300, such as a current temperature, a setpoint temperature, an HVAC function, and/or the like. The active display mode may be contrasted with an inactive display mode (not shown). The inactive display mode can disable a backlight, reduce the amount of information displayed, lessen the intensity of the display, and/or altogether turn off the electronic display 316, depending on the embodiment.

Depending on the settings of the thermostat 300, the active display mode and the inactive display mode of the electronic display 316 may also or instead be characterized by the relative power usage of each mode. In one embodiment, the active display mode may generally require substantially more electrical power than the inactive display mode. In some embodiments, different operating modes of the electronic display 316 may instead be characterized completely by their power usage. In these embodiments, the different operating modes of the electronic display 316 may be referred to as a first mode and a second mode, where the user interface requires more power when operating in the first mode than when operating in the second mode.

According to some embodiments the electronic display 316 may comprise a dot-matrix layout (individually addressable) such that arbitrary shapes can be generated, rather than being a segmented layout. According to some embodiments, a combination of dot-matrix layout and segmented layout is employed. According to some embodiments, electronic display 316 may be a backlit color liquid crystal display (LCD). An example of information displayed on the electronic display 316 is illustrated in FIG. 3, and includes central numerals 320 that are representative of a current setpoint temperature. According to some embodiments, metallic portion 324 can have a number of slot-like openings so as to facilitate the use of a sensors 330, such as a passive infrared motion sensor (PIR), mounted beneath the slot-like openings.

According to some embodiments, the thermostat 300 can include additional components, such as a processing system 360, display driver 364, and a wireless communications system 366. The processing system 360 can adapted or configured to cause the display driver 364 to cause the electronic display 316 to display information to the user. The processing system 360 can also be configured to receive user input via the rotatable ring 312. These additional components, including the processing system 360, can be enclosed within the housing, as displayed in FIG. 3. These additional components are described in further detail herein below.

The processing system 360, according to some embodiments, is capable of carrying out the governance of the thermostat's operation. For example, processing system 360 can be further programmed and/or configured to maintain and update a thermodynamic model for the enclosure in which the HVAC system is installed. According to some embodiments, the wireless communications system 366 can be used to communicate with devices such as personal computers, remote servers, handheld devices, smart phones, and/or other thermostats or HVAC system components. These communications can be peer-to-peer communications, communications through one or more servers located on a private network, or and/or communications through a cloud-based service.

Motion sensing as well as other techniques can be use used in the detection and/or prediction of occupancy, as is described further in U.S. Ser. No. 13/632,070, supra. According to some embodiments, occupancy information can be a used in generating an effective and efficient scheduled program. For example, an active proximity sensor 370A can be provided to detect an approaching user by infrared light reflection, and an ambient light sensor 370B can be provided to sense visible light. The proximity sensor 370A can be used in conjunction with a plurality of other sensors to detect proximity in the range of about one meter so that the thermostat 300 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place or about to take place. The various types of sensors that may be used, as well as the operation of the "wake up" function are described in much greater detail throughout the remainder of this disclosure.

In some embodiments, the thermostat can be physically and/or functionally divided into at least two different units.

Figure 4:
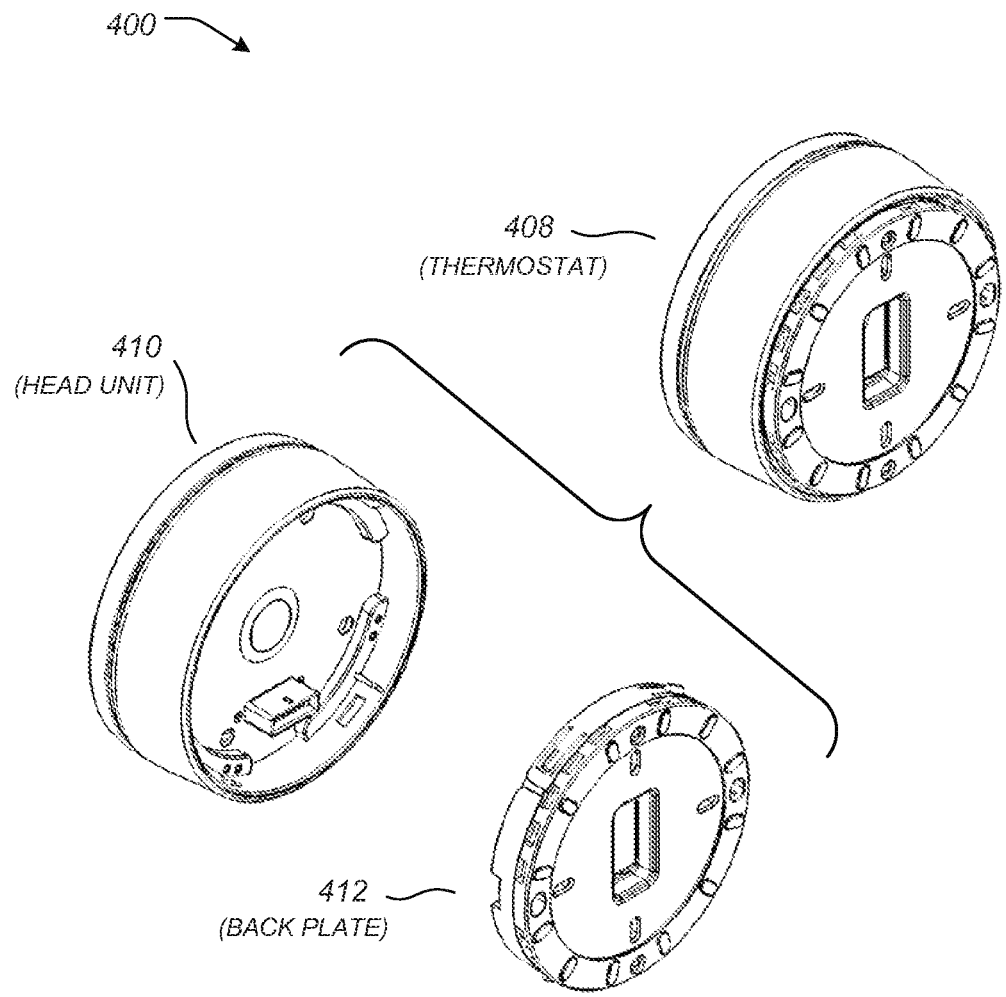
FIG. 4 illustrates an exploded perspective view of a thermostat having a head unit and the backplate, according to one embodiment.

Throughout this disclosure, these two units can be referred to as a head unit and a backplate. FIG. 4 illustrates an exploded perspective view 400 of a thermostat 408 having a head unit 410 and a backplate 412, according to one embodiment. Physically, this arrangement may be advantageous during an installation process. In this embodiment, the backplate 412 can first be attached to a wall, and the HVAC wires can be attached to a plurality of HVAC connectors on the backplate 412. Next, the head unit 410 can be connected to the backplate 412 in order to complete the installation of the thermostat 408.

Figure 5A:
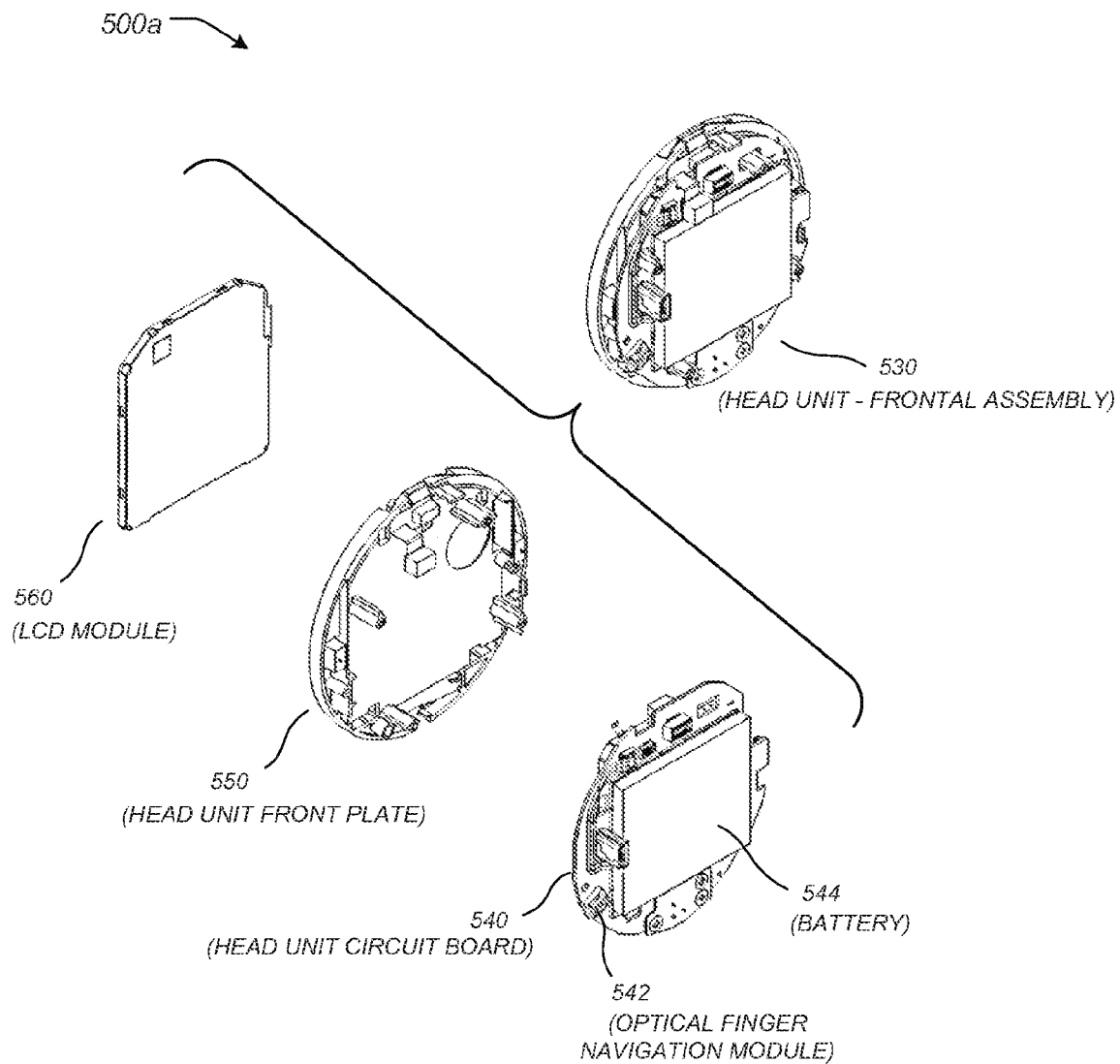
FIG. 5A illustrates an exploded perspective view of a head unit with respect to its primary components, according to one embodiment.

FIG. 5A illustrates an exploded perspective view 500a of a head unit 530 with respect to its primary components, according to one embodiment. Here, the head unit 530 may include an electronic display 560. According to this embodiment, the electronic display 560 may comprise an LCD module. Furthermore, the head unit 530 may include a mounting assembly 550 used to secure the primary components in a completely assembled head unit 530. The head unit 530 may further include a circuit board 540 that can be used to integrate various electronic components described further below. In this particular embodiment, the circuit board 540 of the head unit 530 can include a manipulation sensor 542 to detect user manipulations of the thermostat. In embodiments using a rotatable ring, the manipulation sensor 542 may comprise an optical finger navigation module as illustrated in FIG. 5A. A rechargeable battery 544 may also be included in the assembly of the head unit 530. In one preferred embodiment, rechargeable battery 544 can be a Lithium-Ion battery, which may have a nominal voltage of 3.7 volts and a nominal capacity of 560 mAh.

Figure 5B:
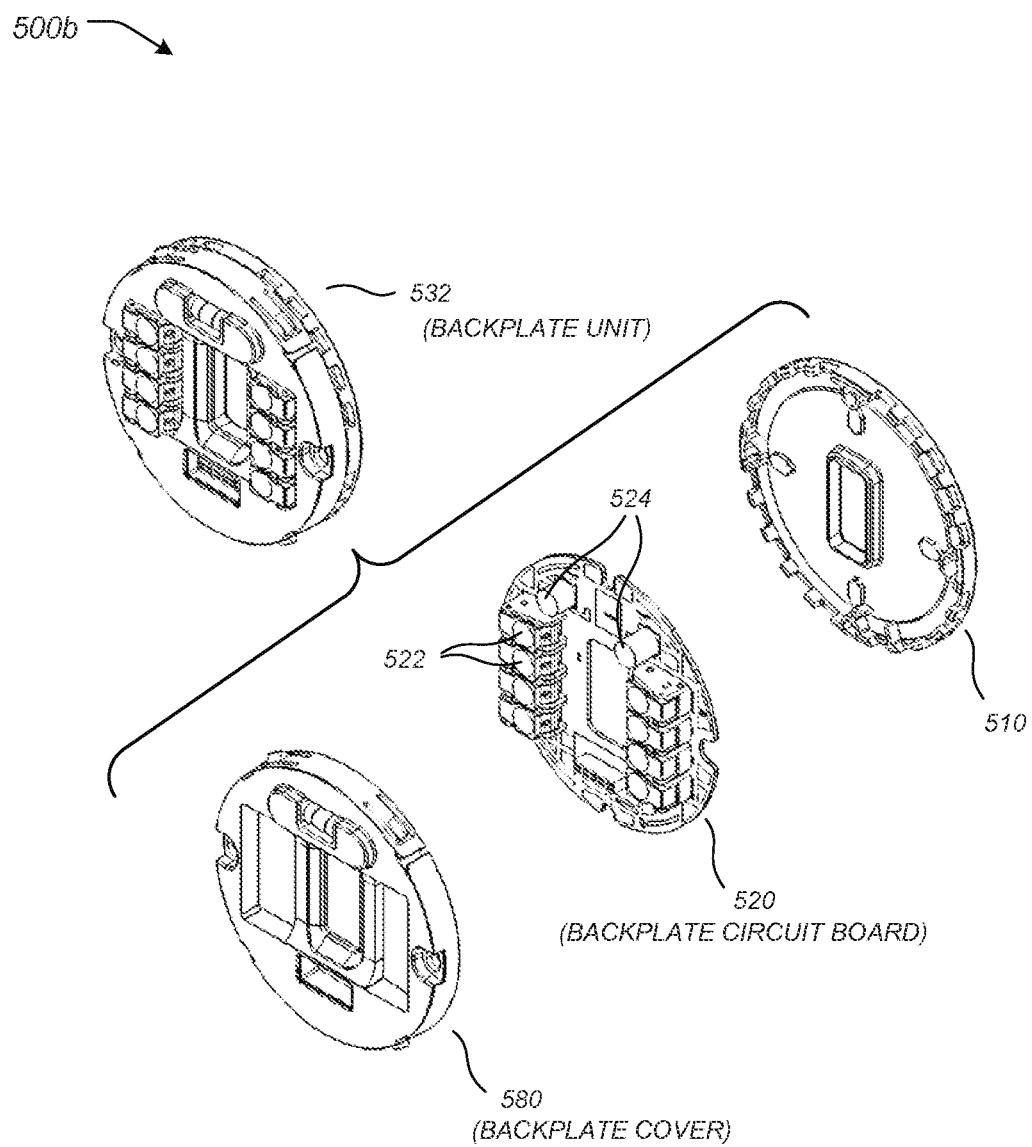
FIG. 5B illustrates an exploded perspective view of a backplate with respect to its primary components, according to one embodiment.

FIG. 5B illustrates an exploded perspective view 500b of a backplate 532 with respect to its primary components, according to one embodiment. The backplate 532 may include a frame 510 that can be used to mount, protect, or house a backplate circuit board 520. The backplate circuit board 520 may be used to mount electronic components, including one or more processing functions, and/or one or more HVAC wire connectors 522. The one or more HVAC wire connectors 522 may include integrated wire insertion sensing circuitry configured to determine whether or not a wire is mechanically and/or electrically connected to each of the one or more HVAC wire connectors 522. In this particular embodiment, two relatively large capacitors 524 are a part of power stealing circuitry that can be mounted to the backplate circuit board 520. The power stealing circuitry is discussed further herein below.

Figure 6A:
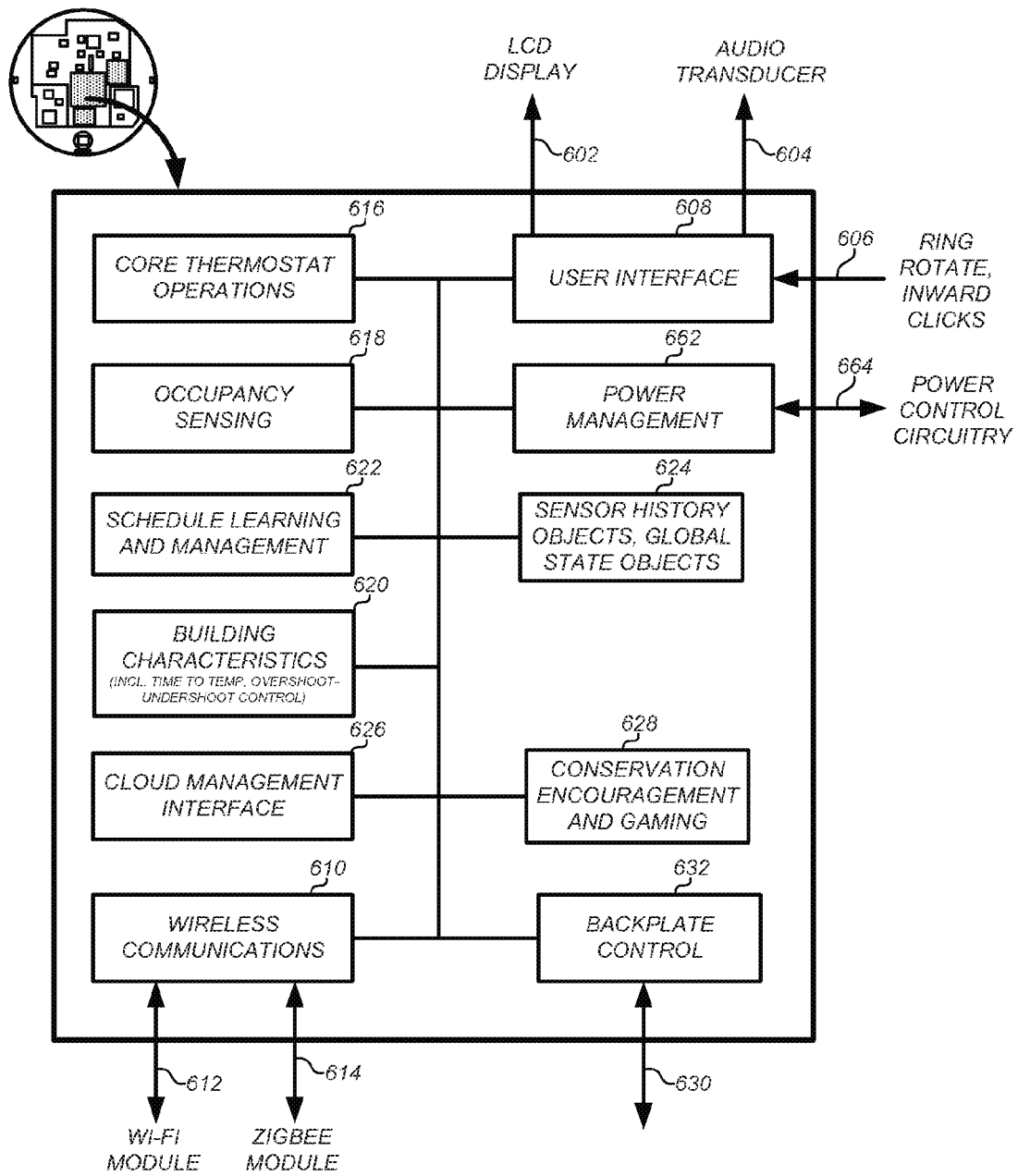
FIG. 6A illustrates a simplified functional block diagram for a head unit, according to one embodiment.

In addition to physical divisions within the thermostat that simplify installation process, the thermostat may also be divided functionally between the head unit and the backplate. FIG. 6A illustrates a simplified functional block diagram 600a for a head unit, according to one embodiment. The functions embodied by block diagram 600a are largely self-explanatory, and may be implemented using one or more processing functions. As used herein, the term "processing function" may refer to any combination of hardware and/or software. For example, a processing function may include a microprocessor, a microcontroller, distributed processors, a lookup table, digital logic, logical/arithmetic functions implemented in analog circuitry, and/or the like. A processing function may also be referred to as a processing system, a processing circuit, or simply a circuit.

In this embodiment, a processing function on the head unit may be implemented by an ARM processor. The head unit processing function may interface with the electronic display 602, an audio system 604, and a manipulation sensor 606 as a part of a user interface 608. The head unit processing function may also facilitate wireless communications 610 by interfacing with various wireless modules, such as a Wi-Fi module 612 and/or a ZigBee module 614. Furthermore, the head unit processing function may be configured to control the core thermostat operations 616, such as operating the HVAC system. The head unit processing function may further be configured to determine or sense occupancy 618 of a physical location, and to determine building characteristics 620 that can be used to determine time-to-temperature characteristics. Using the occupancy sensing 618, the processing function on the head unit may also be configured to learn and manage operational schedules 622, such as diurnal heat and cooling schedules. A power management module 662 may be used to interface with a corresponding power management module on the back plate, the rechargeable battery, and a power control circuit 664 on the back plate.

Additionally, the head unit processing function may include and/or be communicatively coupled to one or more memories. The one or more memories may include one or more sets of instructions that cause the processing function to operate as described above. The one or more memories may also include a sensor history and global state objects 624. The one or more memories may be integrated with the processing function, such as a flash memory or RAM memory available on many commercial microprocessors. The head unit processing function may also be configured to interface with a cloud management system 626, and may also operate to conserve energy wherever appropriate 628. An interface 632 to a backplate processing function 630 may also be included, and may be implemented using a hardware connector.

Figure 6B:
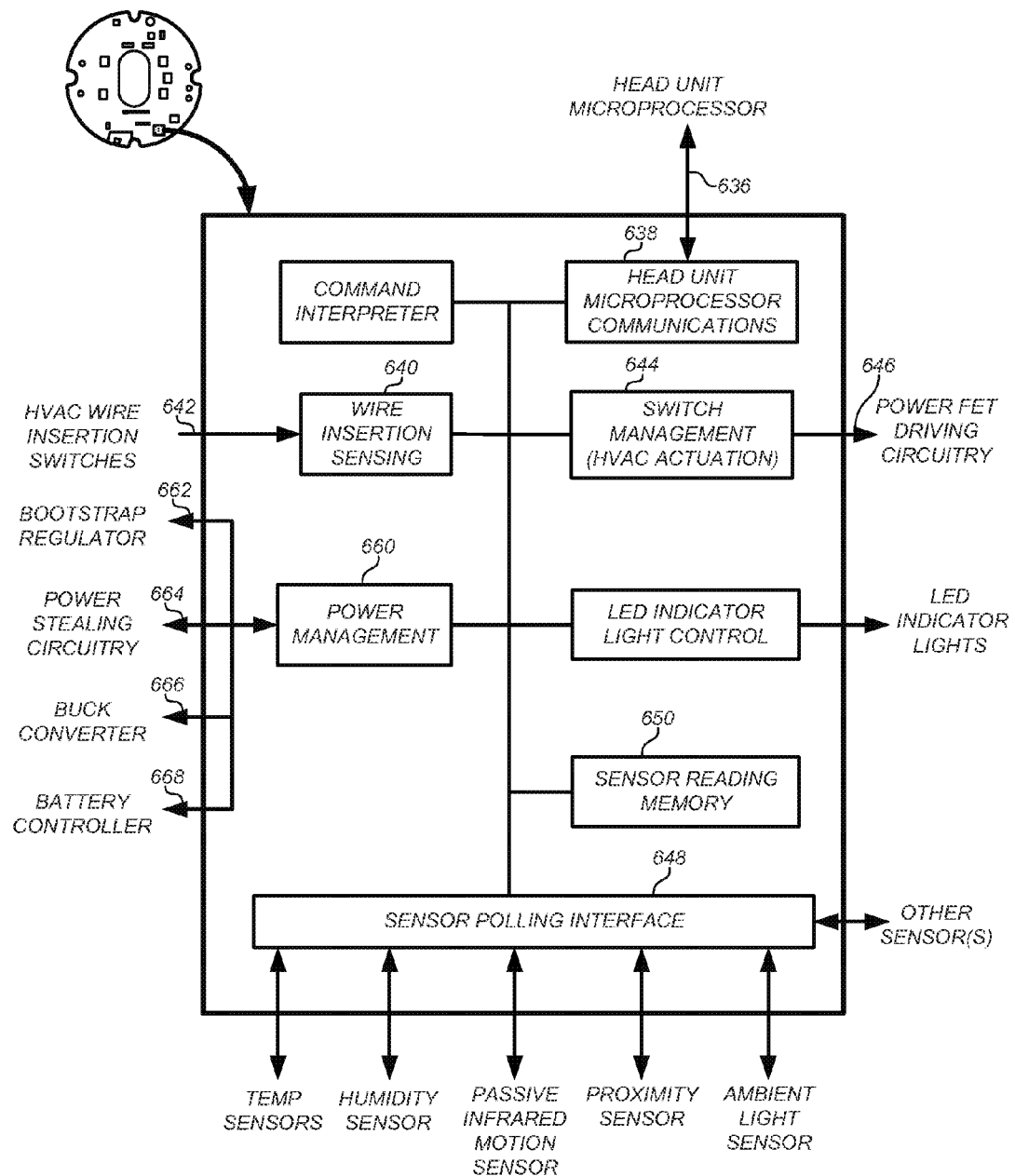
FIG. 6B illustrates a simplified functional block diagram for a backplate, according to one embodiment.

FIG. 6B illustrates a simplified functional block diagram for a backplate, according to one embodiment. Using an interface 636 that is matched to the interface 632 shown in FIG. 6A, the backplate processing function can communicate with the head unit processing function 638. The backplate processing function can include wire insertion sensing 640 that is coupled to external circuitry 642 configured to provide signals based on different wire connection states. The backplate processing function may be configured to manage the HVAC switch actuation 644 by driving power FET circuitry 646 to control the HVAC system.

The backplate processing function may also include a sensor polling interface 648 to interface with a plurality of sensors. In this particular embodiment, the plurality of sensors may include a temperature sensor, a humidity sensor, a PIR sensor, a proximity sensor, an ambient light sensor, and or other sensors not specifically listed. This list is not meant to be exhaustive. Other types of sensors may be used depending on the particular embodiment and application, such as sound sensors, flame sensors, smoke detectors, and/or the like. The sensor polling interface 648 may be communicatively coupled to a sensor reading memory 650. The sensor reading memory 650 can store sensor readings and may be located internally or externally to a microcontroller or microprocessor.

Finally, the backplate processing function can include a power management unit 660 that is used to control various digital and/or analog components integrated with the backplate and used to manage the power system of the thermostat. Although one having skill in the art will recognize many different implementations of a power management system, the power management system of this particular embodiment can include a bootstrap regulator 662, a power stealing circuit 664, a buck converter 666, and/or a battery controller 668.

Figure 7:
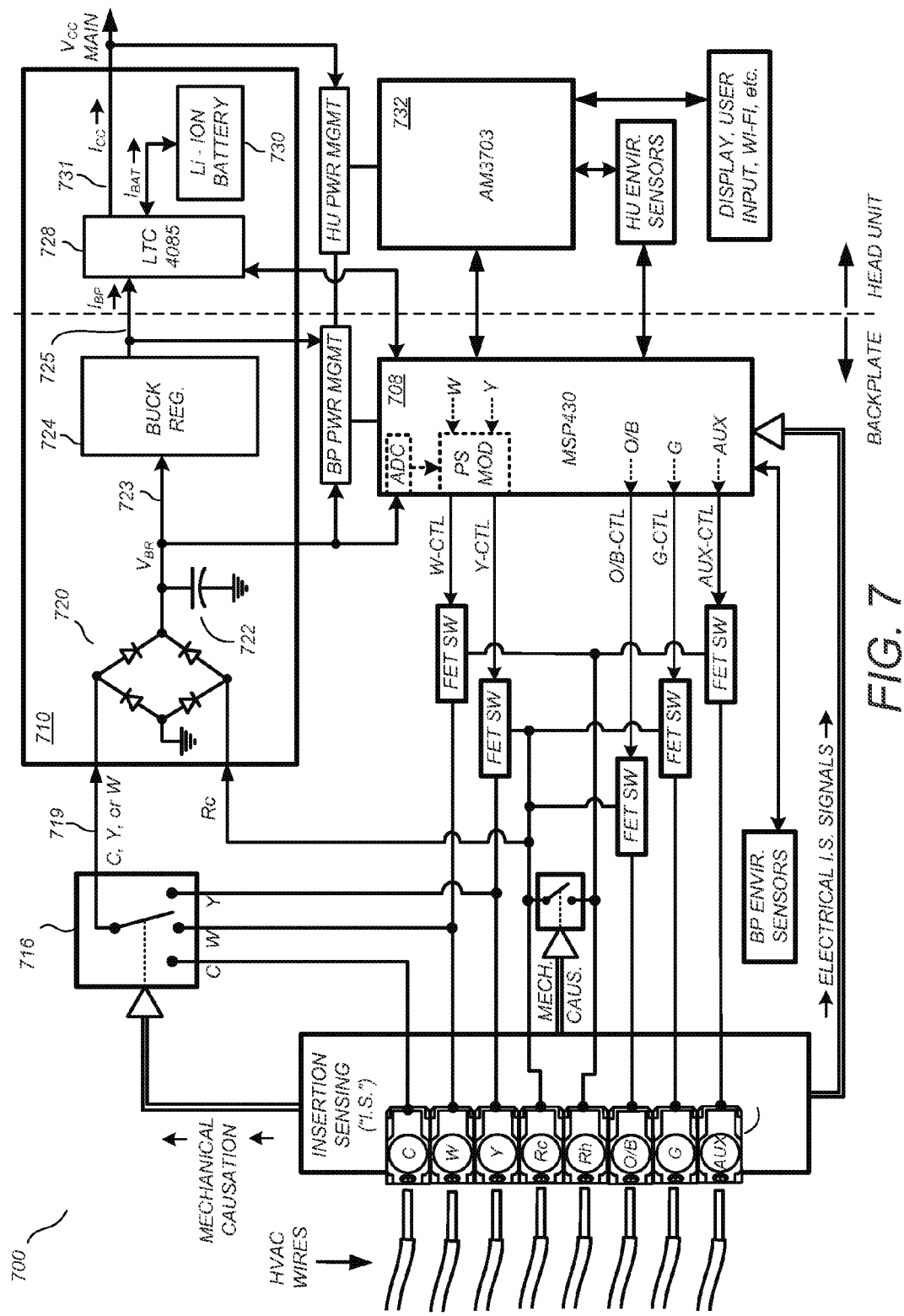
FIG. 7 illustrates a simplified circuit diagram of a system for managing the power consumed by a thermostat, according to one embodiment.

FIG. 7 illustrates a simplified circuit diagram 700 of a system for managing the power consumed by a thermostat, according to one embodiment. The powering circuitry 710 comprises a full-wave bridge rectifier 720, a storage and waveform-smoothing bridge output capacitor 722 (which can be, for example, on the order of 30 microfarads), a buck regulator circuit 724, a power-and-battery (PAB) regulation circuit 728, and a rechargeable lithium-ion battery 730. In conjunction with other control circuitry including backplate power management circuitry 727, head unit power management circuitry 729, and the microcontroller 708, the powering circuitry 710 can be configured and adapted to have the characteristics and functionality described herein below. Description of further details of the powering circuitry 710 and associated components can be found elsewhere in the instant disclosure and/or in U.S. Ser. No. 13/467,025, supra.

By virtue of the configuration illustrated in FIG. 7, when there is a "C" wire presented upon installation, the powering circuitry 710 operates as a relatively high-powered, rechargeable-battery-assisted AC-to-DC converting power supply. When there is not a "C" wire presented, the powering circuitry 710 operates as a power-stealing, rechargeable-battery-assisted AC-to-DC converting power supply. The powering circuitry 710 generally serves to provide the voltage Vcc MAIN that is used by the various electrical components of the thermostat, which in one embodiment can be about 4.0 volts. For the case in which the "C" wire is present, there is no need to worry about accidentally tripping (as there is in inactive power stealing) or untripping (for active power stealing) an HVAC call relay, and therefore relatively large amounts of power can be assumed to be available. Generally, the power supplied by the "C" wire will be greater than the instantaneous power required at any time by the remaining circuits in the thermostat.

However, a "C" wire will typically only be present in about 20% of homes. Therefore, the powering circuitry 710 may also be configured to "steal" power from one of the other HVAC wires in the absence of a "C" wire. As used herein, "inactive power stealing" refers to the power stealing that is performed during periods in which there is no active call in place based on the lead from which power is being stolen. Thus, for cases where it is the "Y" lead from which power is stolen, "inactive power stealing" refers to the power stealing that is performed when there is no active cooling call in place. As used herein, "active power stealing" refers to the power stealing that is performed during periods in which there is an active call in place based on the lead from which power is being stolen. Thus, for cases where it is the "Y" lead from which power is stolen, "active power stealing" refers to the power stealing that is performed when there is an active cooling call in place. During inactive or active power stealing, power can be stolen from a selected one of the available call relay wires. While a complete description of the power stealing circuitry 710 can be found in the commonly assigned applications that have been previously incorporated herein by reference, the following brief explanation is sufficient for purposes of this disclosure.

Some components in the thermostat, such as the head unit processing function, the user interface, and/or the electronic display may consume more instantaneous power than can be provided by power stealing alone. When these more power-hungry components are actively operating, the power supplied by power stealing can be supplemented with the rechargeable battery 730. In other words, when the thermostat is engaged in operations, such as when the electronic display is in an active display mode, power may be supplied by both power stealing and the rechargeable battery 730. In order to preserve the power stored in the rechargeable battery 730, and to give the rechargeable battery 730 an opportunity to recharge, some embodiments optimize the amount of time that the head unit processing function and the electronic display are operating in an active mode. In other words, it may be advantageous in some embodiments to keep the head unit processing function in a sleep mode or low power mode and to keep the electronic display in an inactive display mode as long as possible without affecting the user experience.

When the head unit processing function and the electronic display are in an inactive or sleep mode, the power consumed by the thermostat is generally less than the power provided by power stealing. Therefore, the power that is not consumed by the thermostat can be used to recharge the rechargeable battery 730. In this embodiment, the backplate processing function 708 (MSP430) can be configured to monitor the environmental sensors in a low-power mode, and then wake the head unit processing function 732 (AM3703) when needed to control the HVAC system, such as during preconditioning, and the like. Similarly, the backplate processing function 708 can be used to monitor sensors used to detect ambient temperature conditions, and wake the head unit processing system 732 and/or the electronic display when it is determined that a preconditioning heating or cooling operation is needed.

Stated differently, in accordance with the teachings herein and/or of U.S. Ser. No. 13/467,025, supra, and others of the commonly assigned incorporated applications, the thermostat described herein represents an advanced, multi-sensing, microprocessor-controlled intelligent or "learning" thermostat that provides a rich combination of processing capabilities, intuitive and visually pleasing user interfaces, network connectivity, and energy-saving capabilities (including the presently described preconditioning algorithms) while at the same time not requiring a so-called "C-wire" from the HVAC system or line power from a household wall plug, even though such advanced functionalities can require a greater instantaneous power draw than a "power-stealing" option (i.e., extracting smaller amounts of electrical power from one or more HVAC call relays) can safely provide. By way of example, the head unit microprocessor can draw on the order of 250 mW when awake and processing, the LCD module (e.g., 560) can draw on the order of 250 mW when active. Moreover, the Wi-Fi module (e.g., 612) can draw 250 mW when active, and needs to be active on a consistent basis such as at a consistent 2% duty cycle in common scenarios. However, in order to avoid falsely tripping the HVAC relays for a large number of commercially used HVAC systems, power-stealing circuitry is often limited to power providing capacities on the order of 100 mW-200 mW, which would not be enough to supply the needed power for many common scenarios.

The thermostat resolves such issues at least by virtue of the use of the rechargeable battery (e.g., 544 (or equivalently capable onboard power storage medium)) that will recharge during time intervals in which the hardware power usage is less than what power stealing can safely provide, and that will discharge to provide the needed extra electrical power during time intervals in which the hardware power usage is greater than what power stealing can safely provide. In order to operate in a battery-conscious manner that promotes reduced power usage and extended service life of the rechargeable battery, the thermostat is provided with both (i) a relatively powerful and relatively power-intensive first processor (such as a Texas Instruments AM3703 microprocessor) that is capable of quickly performing more complex functions such as driving a visually pleasing user interface display, calculating a preconditioning curve, and performing various other mathematical learning computations, and (ii) a relatively less powerful and less power-intensive second processor (such as a Texas Instruments MSP430 microcontroller) for performing less intensive tasks, including driving and controlling the occupancy sensors, driving and controlling temperature sensors, and the like. To conserve valuable power, the first processor is maintained in a "sleep" state for extended periods of time and is "woken up" only for occasions in which its capabilities are needed, whereas the second processor is kept on more or less continuously (although preferably slowing down or disabling certain internal clocks for brief periodic intervals to conserve power) to perform its relatively low-power tasks. The first and second processors are mutually configured such that the second processor can "wake" the first processor on the occurrence of certain events, such as sensing an ambient temperature that necessitates preconditioning, which can be termed "wake-on" facilities. These wake-on facilities can be turned on and turned off as part of different functional and/or power-saving goals to be achieved. For example, an ambient temperature sensor can be provided by which the second processor, when detecting an ambient temperature that necessitates preconditioning will "wake up" the first processor so that it can instruct the HVAC system to begin heating or cooling the enclosure and/or display that a preconditioning operation is occurring.

It will be understood by one having skill in the art that the various thermostat embodiments depicted and described in relation to FIGS. 3-7 are merely exemplary and not meant to be limiting. Many other hardware and/or software configurations may be used to implement a thermostat and the various functions described herein below. These embodiments should be seen as an exemplary platform in which the following embodiments can be implemented to provide an enabling disclosure. Of course, the following methods, systems, and/or software program products could also be implemented using different types of thermostats, different hardware, and/or different software.

Figure 8A:
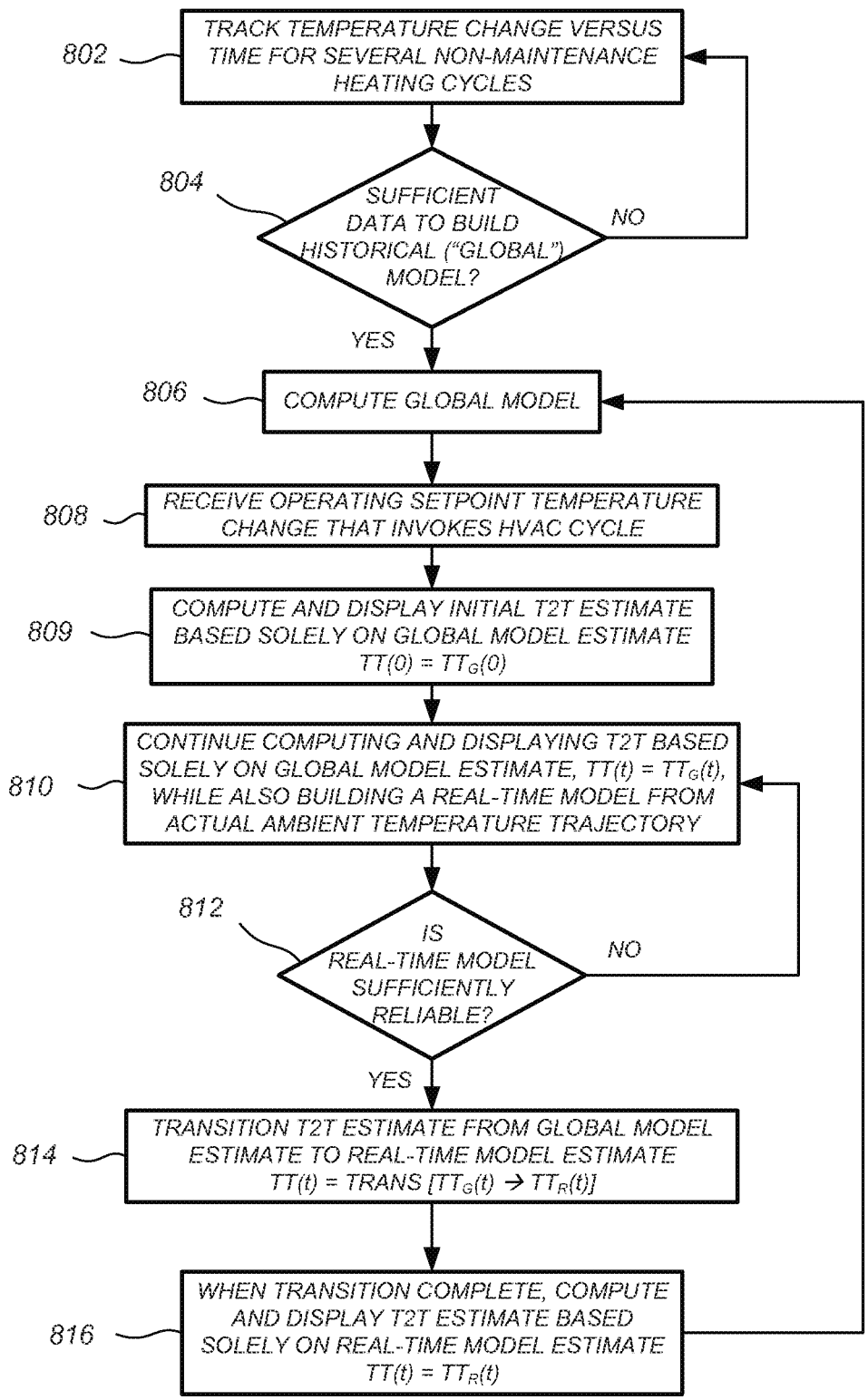
FIG. 8A illustrates a method for a time to temperature computation, according to one embodiment.

FIG. 8A illustrates steps for a time to temperature computation according to an embodiment. As used herein, time to temperature ("T2T") refers to an estimate of the time remaining from the current point in time until the target temperature will be reached. As described herein, the T2T information computed by the thermostat is specific to the heated or cooled enclosure, or in other words, the determined T2T is tailored to the enclosure. In view of the variety of factors that can affect the course of a temperature trajectory over a particular real-world HVAC cycle, the methods described herein have been found to yield reasonably good estimations. Moreover, in the face of the many real-world variations that can occur, some predictable and others not so predictable, the currently described methods for selective display of the T2T information (for example, displaying "under 10 minutes" when the T2T time is getting small and not displaying the T2T information if it is "behaving" in an unexpected or unreliable manner) have been found to provide pleasing overall user experiences with the T2T facility that increase the overall appeal and attractiveness of the thermostat such that the user will be drawn to engage further with its energy-saving features and energy-conscious ecosystem. Notably, while the described examples are provided in the particular context of heating, the skilled artisan would readily be able to apply counterpart methods for the cooling context, which are thus within the scope of the present teachings.

According to one preferred embodiment, the thermostat's T2T algorithm is first implicated by virtue of a learning phase (step 802) that occurs soon after first installation or factory reset, whereby the thermostat begins to build and maintain its own database of T2T-related information, which is customized for that particular enclosure and that particular HVAC system, during the normal course of operation in a first predetermined number of "meaningful" or "non-maintenance" heating cycles. By "non-maintenance" heating cycle, it is meant that there has been an actual setpoint temperature change upon which the heating cycle was instantiated. This can be contrasted with a "maintenance" heating cycle, in which the setpoint temperature has remained the same but the HVAC system was activated due to a drop in temperature and operated until that temperature was again reached (maintained). In one example, the predetermined number of "learning" heating cycles is 10, although this can be varied substantially without departing from the scope of the present teachings. For each such learning cycle, the thermostat automatically (without requiring any affirmative instruction or teaching from the user) tracks the temperature change $\Delta H(t)$ versus time "t", where $t=0$ represents the beginning of the heating cycle.

After a suitable number of learning cycles (step 804), there is built up a sufficient amount of data to automatically generate a historical model "G" of the enclosure, which can alternatively be termed a "global" model, that can be used to provide an initial estimate at the outset of subsequent T2T calculations. The global model can subsequently be continuously improved using more data points as time goes forward, since each heating cycle represents yet another "experiment" for that enclosure to improve the "global model estimate," which can also be termed a "historical model estimate." For one preferred embodiment, the time span of the global model can be limited to only a recent period, such as the most recent 30 to 60 days, so that it will be more likely to reflect the effects of the current season of the year.

Figure 8B:
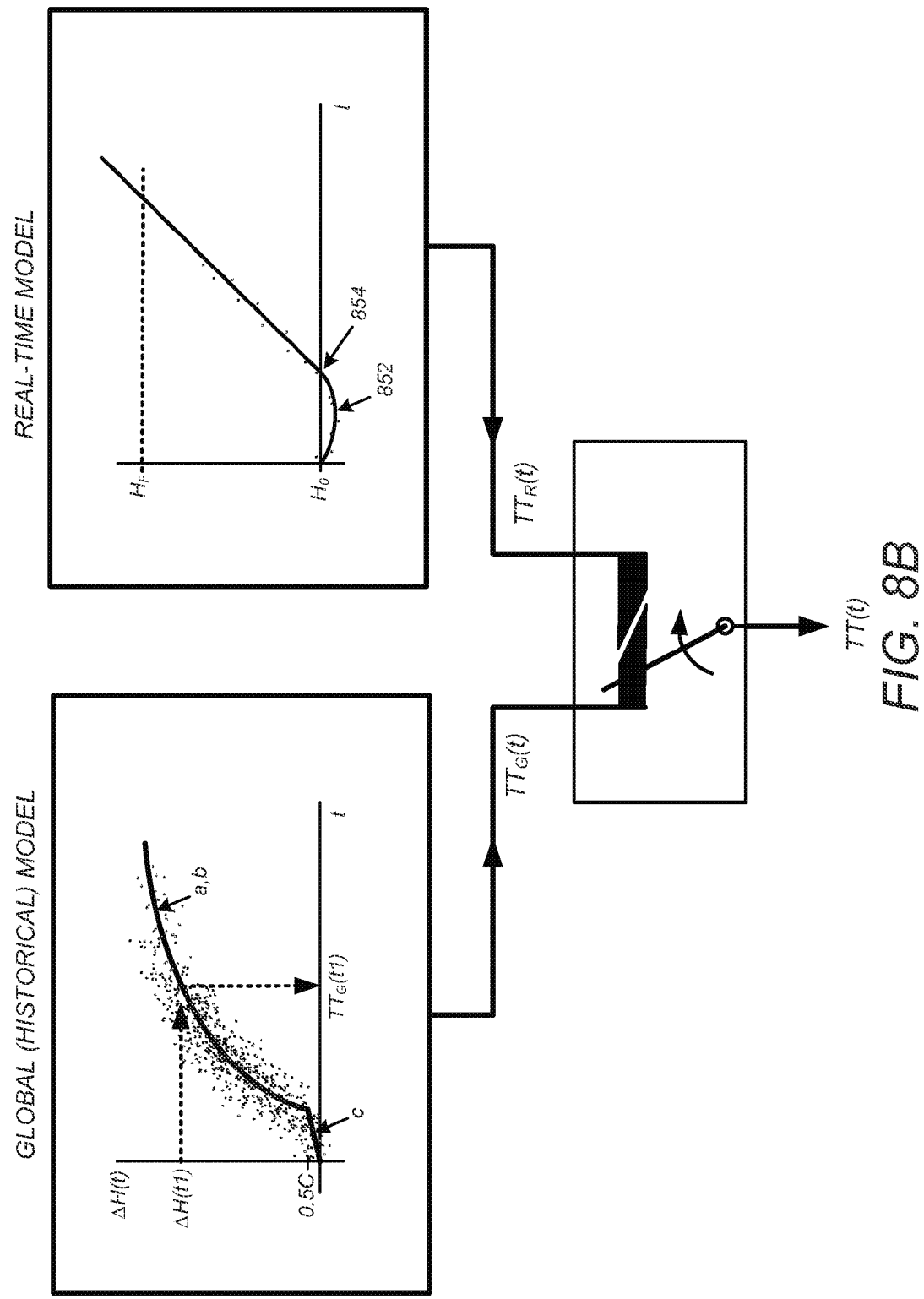
FIG. 8B illustrates a conceptual diagram of the method of FIG. 8A, according to one embodiment.

FIG. 8B illustrates a conceptual diagram of the method of FIG. 8A, including a plot of the global model G. One mathematical function that has been found to be convenient to compute, along with being reasonably suitable, characterizes the global model as a single-parameter straight line (with linear parameter "c") between $\Delta H=0$ and $\Delta H=0.5$ degrees C., and then a two-parameter curve beyond that point (with linear and quadratic parameters "a" and "b", respectively).

Referring now again to FIG. 8A, at step 808 the T2T algorithm is put into use when the current operating setpoint temperature is changed from an initial value $H_0$ to a desired final value $H_F$. This setpoint change can be invoked by a user by using either the walk-up dial or a remote network access facility, or alternatively can be when there is a scheduled setpoint change encountered that changes the current operating setpoint temperature. At step 812, an initial estimate T2T(0) is computed using only the global model G, by mapping the value $H_F-H_0=\Delta H(0)$ into T2T(0) using the global model G as shown in FIG. 8B. This initial estimate, which can be called a global-model initial estimate, can be shown immediately on the thermostat display, even in real time as the user turns the dial for the case of a manual walk-up setpoint change.

At step 810, in what will usually last over the next several minutes of the heating cycle, a global-model estimate continues to be used to provide the current time to temperature estimate TT(t), by virtue of mapping the current measured room temperature H(t) into TT(t) using the global model G.

The global model T2T estimate is denoted herein by $TT_G(t)$. The actual room temperature values H(t) can be provided at regular periodic intervals, such as every 30 seconds, by the thermostat sensing circuitry. According to a preferred embodiment, during this time period in which the global estimate is being used for display purposes, a real-time model R is being built up by virtue of tracking the current value of $\Delta H(t)=H(t)-H_0$ versus time. It has been found by the present inventors that the real-time model R, which can alternatively be called a "local" model, does not become useful for purposes of T2T estimation until such time as a reasonably straight line (statistically speaking) can be established, and that this straight line can often not be established until there has been a certain predetermined empirically-established rise, such as 0.2 degrees C., at a point 854 following a lowest point 852 in trajectory of H(t). One empirically-established guideline that has been found useful is to wait until 10 temperature samples spaced 30 seconds apart subsequent to the 0.2 degree C. post-nadir rise point 854 until a reasonably appropriate estimate can be computed using the real-time model. According to one preferred embodiment, the real-time model R can be used to establish a "real-time model estimate" by using a straight-line projection onto the target temperature line, as shown in FIG. 8B. The real-time model T2T estimate is denoted herein by $TT_R(t)$. For one embodiment, only the latest 10 temperature samples (or other suitable number of recent samples) are used to project the straight line that computes the real-time estimate $TT_R(t)$. In other embodiments, all of the data points subsequent to the point 854 can be used to compute the $TT_R(t)$.

If at step 812 it is determined that the real-time model estimate $TT_R(t)$ is not sufficiently reliable (e.g., using the above-described criterion of 10 points spaced 30 seconds apart following the point 854), then step 810 repeats until such time as $TT_R(t)$ is sufficiently reliable, whereupon step 814 is carried out. At step 814 there is instantiated a transition between the global-model estimate $TT_G(t)$ real-time model estimate $TT_R(t)$, such that there is not a "jump" in the actual value of TT(t), which can be disconcerting to a user who is viewing the display, the transition being summarized as $TT(t)=TRANS[TT_G(t) \rightarrow TT_R(t)]$. The transition can be achieved in a variety of ways without departing from the scope of the present teachings, but in one preferred embodiment is performed as a straight-line transition from one curve to the other, where the transition occurs at a rate of not more than 10 seconds per second. Once the transition is complete, the real-time estimate alone can be used (step 816) until the end of the cycle.

As indicated in FIG. 8A, subsequent to the end of the cycle at step 816, there can be carried out a recomputation of the global model at step 806 so that the most recent historical data can be leveraged prior to instantiation of the next heating cycle. Alternatively, the global model can be recomputed once every several cycles, once per day, or on some other periodic basis.

Preferably, there are plural safeguards incorporated along with the steps 814-816 such that "sanity" is retained in the displayed T2T estimate. If the safeguards indicate a state of unreliability or other "sanity" problem for the real-time model estimate, then the T2T display is simply turned off, and instead of a time reading, there will simply by the word HEATING (or the like) that is displayed. By way of example, if the statistical deviation of the data samples from a straight line subsequent to point 854 is greater than a certain threshold, the T2T display is turned off. Likewise, if the real-time model estimate of T2T starts growing for an extended period of time, or indicates an unreasonably large number, the T2T display is turned off.

Exemplary Predictive Controls

The thermostats described herein may be used to "pre-condition" an enclosure, such as a home, to a defined setpoint temperature. As used herein, preconditioning an enclosure describes a heating or cooling operation that is designed to condition an ambient temperature of the enclosure so that it is near a setpoint temperature at a setpoint time. For convenience, the enclosure will be generally described hereinafter as a home, although those skilled in the art will recognize that the described thermostats and operations may be used to precondition any type of enclosure including office spaces, buildings, apartments, townhomes, duplexes, and the like. An example of a situation in which a preconditioning operation may be performed is heating a home early in the morning so that the home is near a desired setpoint temperature when occupants of the home begin to rise. Since some amount of time is required to heat or cool homes or other enclosures to the desired temperature, the heating or cooling operation may be performed before the actual setpoint time so that the occupants are not uncomfortable.

Figure 9:
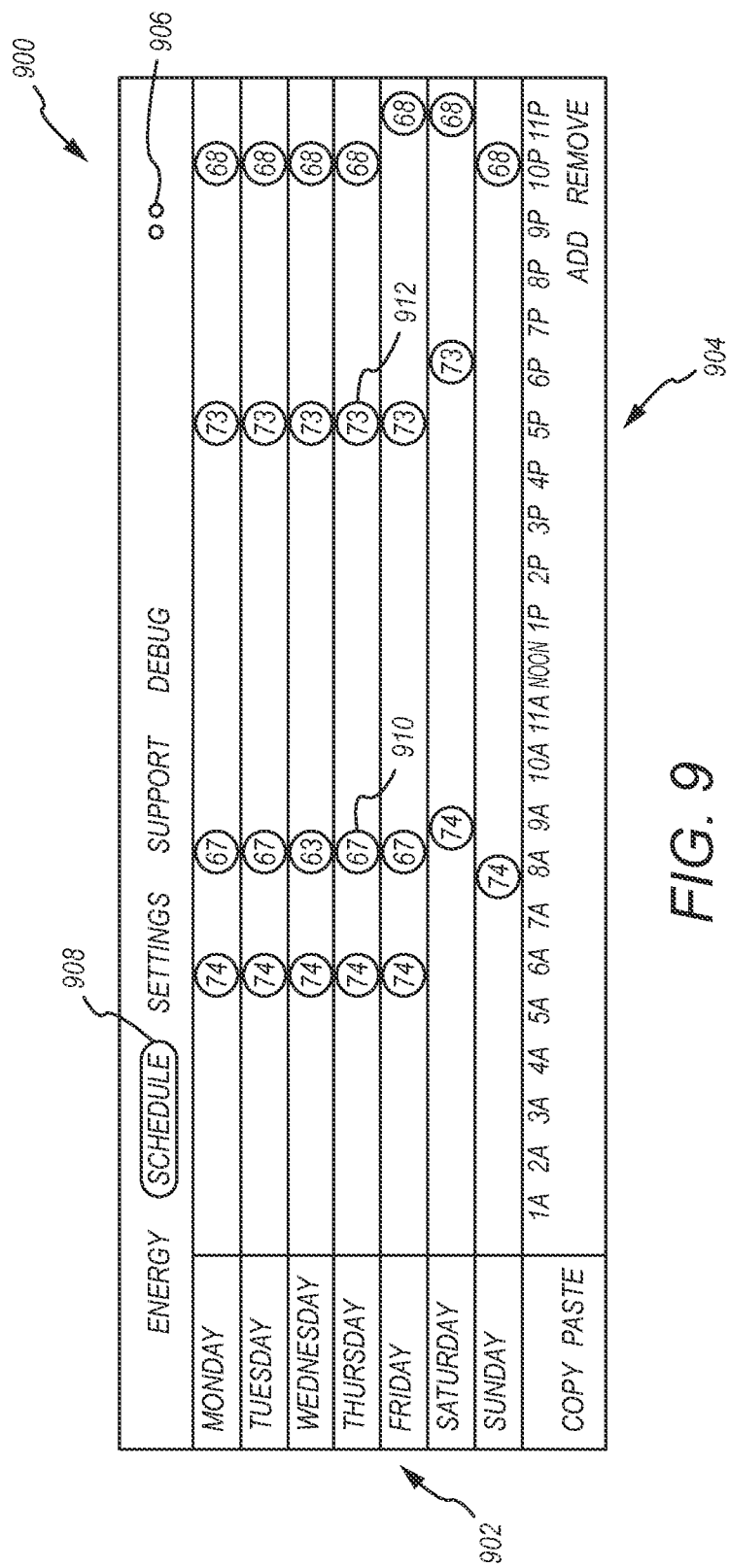
FIG. 9 illustrates an exemplary heating schedule, according to one embodiment.

Preconditioning operations are usually performed in accordance with a heating or cooling schedule. FIG. 9 illustrates an exemplary heating schedule 900 that may be used for a home or other enclosure. The schedule 900 of FIG. 9 may illustrate a schedule that is displayed on a webpage over a network, such as the Internet. A user may interact with the webpage to change heating or cooling operations displayed on the schedule and/or to change a current setpoint of the thermostat. Similar schedules may be displayed on wireless devices, such as via an application displayed on a cell phone. A version of the schedule may also appear on a display of the thermostat. The user may be able to interact with the schedule via any of these mediums to change or set one or more setpoint times and/or temperatures.

Schedule 900 may include indicia 906 that displays whether the schedule is for heating or cooling cycles. The display may also show various functions or controls 908 for the thermostat including the heating/cooling schedule. Schedule 900 also includes a listing of days of the week 902 and a time of day 904. Setpoint icons (i.e., 910 and 912) are displayed for corresponding days 902 and times 904 that a heating or cooling operation is to be performed. For example, on any given day (e.g., Thursday), schedule 900 may include a first setpoint 910 that is characterized by a first setpoint temperature (e.g., 67° Fahrenheit) and a first setpoint time (e.g., 8 a.m.). The thermostat maintains the home near the first setpoint temperature 910 by cycling the HVAC system on and off when ambient conditions rise above or below a maintenance band threshold, which is typically ±0.7 degrees Fahrenheit from the setpoint temperature for heating and ±1 degree Fahrenheit from the setpoint temperature for cooling. These values may be adjusted as the thermostat learns to correct temperature overshoots and undershoots.

On that same day (e.g., Thursday), or a different day, schedule 900 may also include a second setpoint 912 that is likewise characterized by a second setpoint temperature (e.g., 73° Fahrenheit) and a second setpoint time (e.g., 5 p.m.). After the second setpoint time is reached (e.g., 5 p.m.) the conditioning operations of the thermostat will be controlled by the second setpoint 912. With some conventional thermostat systems, the thermostat will maintain the home's ambient temperature at roughly the first setpoint temperature until the second setpoint time is reached, after which the thermostat will begin to maintain the home's ambient temperature at roughly the second setpoint temperature. As can be readily understood, an interval of time exists between the first setpoint time and second setpoint time, which in the instant example is approximately 9 hours. In some embodiments, the thermostat may not allow the time interval between adjacent setpoint to be less than 1 hour, so as to conserve energy usage. In other embodiments, the time interval may be less than 1 hour, such as 15 minutes. In the embodiments described herein, a preconditioning heating or cooling operation is performed during the interval of time before the second setpoint time so that the ambient temperature reaches substantially the second setpoint temperature by the second setpoint time. In this manner, the home's temperature may be near the desired temperature at the desired time.

Although not shown on schedule 900, the schedule may also include a range setpoint that defines both a lower range temperature and an upper range temperature. In such embodiments, if the home's ambient temperature drops below the lower range temperature a heating operation is performed, and if the home's ambient temperature rises above the upper range temperature a cooling operation is performed. As described herein, the preconditioning operation may be performed when range setpoints are used. Additionally, the schedule 900's icons may be color coordinated to visually indicate if a heating or cooling operation is to be performed, such as being blue for cooling operations and orange or red for heating operations.

Figure 10A:
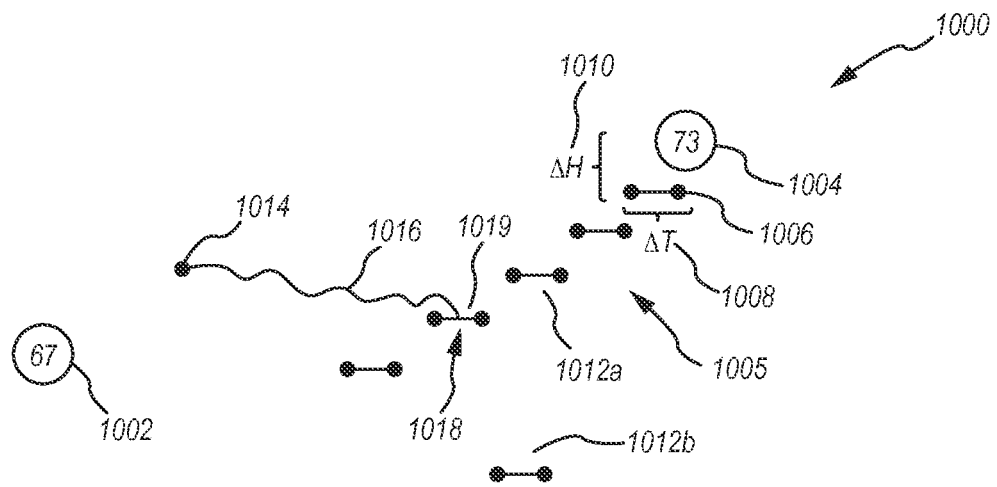
FIGS. 10A-C illustrate various preconditioning operations where a set of preconditioning criteria information is calculated, according to one embodiment.

To perform the preconditioning operation, or more specifically, to cause the thermostat to enter a preconditioning state in which the thermostat causes the HVAC system to cycle on before the setpoint time, the thermostat may compute preconditioning criteria information (PCI) that is representative of time and ambient temperature conditions for which preconditioning should be performed. FIGS. 10A and B graphically illustrate a set of PCI being computed for respective heating and cooling conditions. Referring to FIG. 10A, illustrated is a preconditioning heating operation 1000 where a set of PCI 1005 is computed that represents time and ambient temperature conditions for which preconditioning heating should be performed.

FIG. 10A illustrates a first setpoint 1002 that is characterized by a time (not shown) and temperature (e.g., 67° Fahrenheit). FIG. 10A also illustrates a second setpoint 1004 that is also characterized by a time (not shown) and temperature (e.g., 73° Fahrenheit). A time interval exists between the two setpoints, which in some embodiments may be about 1 hour or more. The thermostat computes the PCI 1005 by processing the second setpoint temperature in conjunction with information derived from a historical record (e.g., Global Model G) stored in memory of previous heating and cooling cycles for the HVAC system as controlled by the thermostat. For example, the thermostat may use the time to temperature ("T2T") algorithm described previously to estimate an amount of temperature that can be overcome in a given amount of time as described in more detail below.

In one embodiment, the set of PCI 1005 is computed by referencing the second setpoint 1004 and stepping backward in time in the time interval by a first duration 1006 characterized by a defined change in time $\Delta T$ 1008. Based on the defined change in time $\Delta T$ 1008, the thermostat computes an amount of heating or temperature change $\Delta H$ 1010 that is likely to occur during the first duration 1006 if heat is applied from the HVAC system. The temperature change $\Delta H$ 1010 is determined by querying the T2T algorithm and Global Model G data described above to estimate a temperature change for the home or enclosure if heat is applied for the first duration 1006. In other words, instead of using the T2T algorithm to obtain a time estimate for how long it will take for a change in temperature $\Delta H$ to occur, a known time interval $\Delta T$ is used to obtain an estimate of a temperature change $\Delta H$ for the enclosure if heat is applied for the known time interval $\Delta T$. Using the T2T algorithm and Global Model G data, the set of computed PCI is tailored or unique to the individual home or enclosure. Also, as described herein, the T2T algorithm and Global Model G data are continually updated and adjusted, which results in relatively accurate and up-to-date PCI computations for the home.

Based on the computed $\Delta H$ 1010, the thermostat determines a triggering temperature for the first duration 1006. The triggering temperature functions as a temperature threshold to trigger the preconditioning heating operation if the ambient temperature of the home falls to or below the triggering temperature. For example, given the second setpoint temperature 1004 is approximately 73° Fahrenheit and assuming a first duration 1006 of approximately 5 minutes from the second setpoint 1004 (i.e., time change $\Delta T$ 1008 is 5 minutes), the thermostat may use the T2T algorithm and Global Model G data to estimate or compute that a temperature change $\Delta H$ 1010 of approximately 1° Fahrenheit is likely to occur during the first duration 1006. The thermostat may then set the triggering temperature of approximately 72° Fahrenheit so that if the ambient temperature of the home falls to or below 72° Fahrenheit within 5 minutes from the second setpoint 1004, the HVAC system will be cycled on and preconditioning will occur.

This process is repeated to compute the remainder of the PCI. For example, a second duration, a third duration, and the like, are computed by referencing the second setpoint time 1004 and stepping back a respective amount of time. The second duration, third duration, and the like, are typically characterized by adding the defined change in time $\Delta T$ 1008 to the subsequent duration. For example, the second duration is typically equal to $2*\Delta T$ 1008, or the sum of the first duration 1006 plus the defined change in time $\Delta T$ 1008. Likewise, the third duration is typically equal to $3*\Delta T$ 1008, or the sum of the first two durations plus the defined change in time $\Delta T$ 1008. Although in this embodiment each time duration is a multiple of the defined change in time $\Delta T$, in other embodiments the time interval of each duration may vary.

Based on the second duration, the third duration, and the like, the thermostat computes an amount of heating or temperature change $\Delta H$ that is likely to occur if heat is applied from the HVAC system for each respective duration. Unlike the respective time durations, however, which are typically multiples of the defined change in time $\Delta T$ 1008, the estimated temperature change $\Delta H$ is not likely to be a multiple or sum of previous temperature changes $\Delta H$. Rather, the response of the home or enclosure to heating cycles is likely to be nonlinear and, thus, the temperature change $\Delta H$ for each duration, or for several durations, may be different. As described above, the temperature change $\Delta H$ is determined by querying the T2T algorithm and Global Model G data to estimate a temperature change for the home or enclosure if heat is applied for the respective duration.

Based on the computed $\Delta H$ for each duration, the thermostat determines a triggering temperature for each duration. For example, using the second setpoint temperature 1004 of approximately 73° Fahrenheit and a defined time change ΔT 1008 of 5 minutes, the first duration 1006 is computed to be 5 minutes, the second duration is computed to be 10 minutes, the third duration is computed to be 15 minutes, and the process is repeated for any additional durations. Using the T2T algorithm and Global Model G data, the thermostat may estimate or compute a first temperature change ΔH for the first duration of approximately 1° Fahrenheit, a second temperature change ΔH for the second duration of approximately 2.5° Fahrenheit, a third temperature change ΔH for the third duration of approximately 6° Fahrenheit, and additional temperature changes ΔH for any subsequent durations. The thermostat may then set a triggering temperature of approximately 72° Fahrenheit for the first duration, a triggering temperature of approximately 70.5° Fahrenheit for the second duration, a triggering temperature of approximately 67° Fahrenheit for the third duration, and the like.

If the ambient temperature of the home as measured by the thermostat falls to or below one of these triggering temperatures within the respective durations from the setpoint time, the HVAC system will be cycled on and preconditioning will occur. For example, FIG. 10A illustrates an ambient temperature reading 1014 at time (i) and a temperature trajectory 1016 for an ambient temperature of the home. At a subsequent time (i.e., i+k), the ambient temperature may fall to or below a triggering temperature 1018 for an $n^{th}$ duration 1019. Triggering temperature 1018 may trigger the HVAC system on to precondition the ambient temperature to near the second setpoint temperature 1004 by the second setpoint time.

In some embodiments, the PCI computation, historical data/T2T estimate, and the like, may be computed by the head unit in the "awake" state or mode of operation, which as described herein has a relatively high computational and energy capacity. Some of the computed information may be passed to the backplate for monitoring purposes. For example, in one embodiment, the time duration, triggering temperature, and/or ΔH information is passed to the backplate from the head unit. After this information is passed to the backplate, the head unit may enter a "sleep" state or mode of operation to conserve battery power and/or recharge the battery as described herein. The backplate monitors ambient temperature and/or other conditions, via one or more of the sensors described herein, and wakes the head unit up when the ambient temperature reaches or drops below one of the triggering temperatures. The head unit recognizes that a preconditioning operation should be performed and instructs the HVAC system accordingly.

"Passing" or communicating the information from the head unit to the backplate may involve storing the PCI, or a subset thereof, on a memory device that is accessible by the backplate and/or head unit. The memory may be located within the thermostat or remotely, such as on a cloud service. In some embodiments, the head unit and/or backplate may include memory that may be used to store some or all of the PCI. Passing the information may also involve passing the information directly to the backplate, after which the backplate may store the information on a memory device.

In some embodiments, the head unit may calculate the PCI every time it wakes up and communicate the subset of information (e.g., the time durations and triggering temperatures) to the backplate prior to entering the sleep mode. The head unit may wake up for various reasons, which may or may not be related to preconditioning, such as when a proximity sensor is tripped, when the ambient temperature falls below or rises above a maintenance band threshold triggering an HVAC on or off operation, when a subsequent setpoint is adjusted, after a predetermined or programmed time, and the like.

In measuring the ambient temperature conditions and comparing these conditions with the triggering temperature conditions, the backplate may measure or calculate time relative to when the head unit enters the sleep mode. For example, although the PCI is typically calculated from time durations measured relative to the second setpoint, the triggering temperatures may be passed to the backplate measured relative to when the head unit enters the sleep mode. The backplate may then determine a change in time relative to when the head unit enters the sleep mode (e.g., 20 minutes from entering the sleep mode) and determine if a preconditioning triggering temperature is associated with that relative time. In this manner, the backplate may only be concerned with time measured relative to when the head unit entered the sleep mode and not concerned with computing a current time relative to the setpoint time. As can be easily understood, each time the head unit passes the subset of information to the backplate, the relative time measurements may be adjusted.

In some embodiments, the head unit may only pass a subset of the PCI that is calculated to the backplate instead of all the PCI. For example, the head unit may anticipate a wake up event during the time interval (e.g., due to maintenance and the like), but before the second setpoint time. In such instances, the head unit may only pass PCI up to the anticipated wake up time since at the anticipated time, the head unit will wake up and recalculate PCI if needed. Stated differently, the PCI after the anticipated time will not be sent to the backplate since this information is irrelevant due to the head unit recalculating the PCI at the anticipated wake up time. In other embodiments, the PCI that is passed to the backplate may be limited to trigger temperatures that are above the first setpoint temperature 1002. For example, according to customary operation of the thermostat, the ambient temperature of the enclosure will be kept near the first setpoint temperature by the thermostat awaking and cycling the HVAC system on when the ambient temperature drops below a lower maintenance band threshold defined by the first setpoint temperature (e.g., −0.7 Fahrenheit from the first setpoint temperature). Since the first setpoint temperature 1002 defines a lower bound for the ambient temperature, triggering ambient temperatures below the first setpoint temperature are irrelevant because the ambient temperature will not drop to these temperatures. Accordingly, in some embodiments, triggering temperatures below the first setpoint temperature 1002 may not be passed to the backplate.

Although operations of the head unit and backplate in relation to the preconditioning operations are described herein, embodiments of the invention are not limited to operating in the manner. In some embodiments, a majority or all of the PCI may be transmitted from the head unit to the backplate. In addition, the backplate may perform some or all of the calculations described as being performed by the head unit. In other embodiments, such as when the thermostat is electrically connected to a "C" wire, all of the PCI calculations and monitoring of the ambient conditions may be performed by the head unit.

The PCI 1005 in FIG. 10A is essentially a step function having both a plurality of defined time durations and triggering temperatures. PCI 1005 defines a lower range of temperature values that trigger a preconditioning heating operation. In other embodiments, however, the PCI may be represented by a curve, a line, a plurality of dots, and the like. For example, in one embodiment, the time change intervals ΔT may be sufficiently small such that a curve is essentially produced. In other embodiments, a curve may be generated by estimating or averaging each of the computed triggering temperatures and "fitting" a line that models the computed temperatures. The above described step function, however, may be ideal for power limited or constrained devices, such as the thermostat described herein, due to the reduction in computational and/or power requirements necessary to formulate the PCI 1005. The step function may also reduce the volume of information that may be passed from the head unit to the backplate, thereby reducing the computational and/or power requirements of the backplate as well. In some embodiments, such as when the thermostat is electrically connected to a "C" wire, the computational operations may be increased.

Although the time change intervals ΔT are generally described herein as being approximately 5 minutes, in other embodiments, the time change intervals ΔT may have longer or shorter durations. For example, in some embodiments, the time change interval ΔT may be about 10 minutes, 15 minutes, 20 minutes, and the like. In contrast, in other embodiments, the time change interval ΔT may be 3 minutes, 1 minute, 30 seconds, and the like. A time change interval ΔT of about 5 minutes, however, has been determined to provide a sufficient number of steps while minimizing computation and energy requirements and head unit wake up times.

In some embodiments, the preconditioning time or the duration in which preconditioning may be performed is limited to a defined amount. The preconditioning time may likewise be limited based on the preconditioning process involved (i.e., heating or cooling) and/or based on one or more characteristics or settings of the HVAC system. This preconditioning time limit may be implemented to conserve energy and/or make a user's experience more enjoyable so that heating or cooling operation is not occurring too far in advance of the upcoming setpoint. According to one embodiment, a preconditioning cooling process may be limited to about 30 minutes, 60 minutes, 90 minutes, and the like, prior to the next setpoint. Heating processes could likewise be limited or may be based on the operational settings of the heater, such as the setting of a heat pump (e.g., max comfort vs. max savings), as set forth in U.S. Ser. No. 13/632,093, supra. For example, a max comfort setting may trigger a preconditioning time limit of about 2 hours, while a max savings setting may trigger a preconditioning time limit of about 1 hour. The time limit may likewise be limited based on the heating procedure performed, such as heating with a heat pump, gas furnace, radiant heater, resistive heating, and the like.

In addition to time to temperature "T2T", other "turn on" or activation criteria may be used to evaluate any particular point on the PCI such as those set forth in U.S. Ser. No. 13/632,093, supra. For example, in some embodiments, one or more time durations or steps of the PCI may be set to an arbitrary large or small value in order to prevent a preconditioning operation from occurring. This may be useful when the heating or cooling unit is unable to perform a heating or cooling operation such as during a compressor lockout period. For example, as illustrated in FIG. 10A, to prevent a heating operation from occurring for $n^{th}$ time duration 1012a, which may coincide with a compressor lockout period or other period in which the HVAC system is unable to operate, the triggering temperature of $n^{th}$ time duration 1012a may be set to a substantially low value 1012b (e.g., 25° Fahrenheit) to prevent triggering of the preconditioning operation. Similarly, in cooling operations the cooling value that triggers preconditioning may be significantly higher than any temperature that the ambient temperature is expected to reach (e.g., 150° Fahrenheit and the like).

In some embodiments, the PCI can be based on more than one prospective setpoint. For example, the thermostat may use second setpoint 1004 and a subsequent setpoint or setpoints to calculate the PCI. In this manner preconditioning may begin for or take into account setpoints that occur beyond an immediately upcoming setpoint.

In some embodiments, the user may be provided with an option to perform preconditioning or not. For example, the user may be queried about whether preconditioning should be performed at all, or preconditioning may be a selectable option in the user interface that the user may set. In other embodiments, preconditioning may be a default feature of one heating or cooling operation and a selectable feature for another heating or cooling operation. For example, if a radiant heating operation is selected, the thermostat may automatically apply the preconditioning operation since radiant heating often requires a longer length of time to reach a given set point temperature. In other heating or cooling operations however, such as gas furnace or heat pump operations, the user may be queried about whether preconditioning should be performed.

Figure 10B:
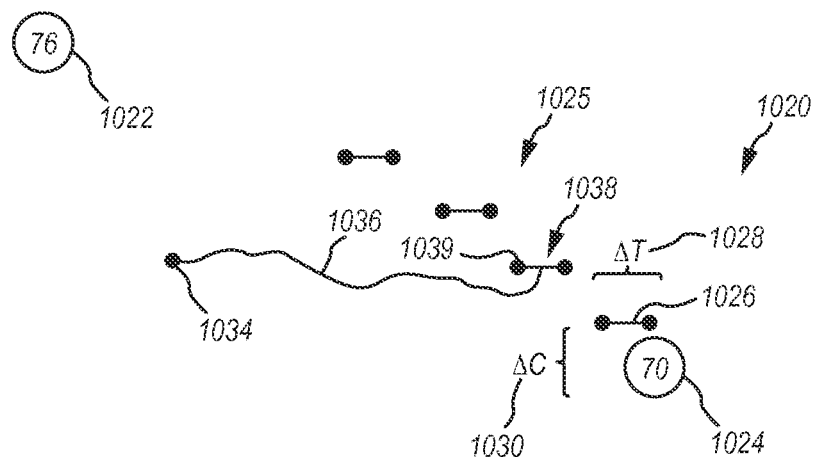

FIG. 10B illustrates a preconditioning cooling operation 1020 that is essentially the reverse of the heating operation described for FIG. 10A. The process involves computing a set of PCI 1025 that represents ambient conditions for which preconditioning cooling should be triggered. The process is similar to that described for FIG. 10A and, thus, some of the previous description is omitted.

FIG. 10B illustrates a first setpoint 1022 that is characterized by a time (not shown) and temperature (e.g., 76° Fahrenheit). FIG. 10B also illustrates a second setpoint 1024 that is also characterized by a time (not shown) and temperature (e.g., 70° Fahrenheit). A time interval exists between the two setpoints, which in some embodiments may be about 1 hour or more. The thermostat computes the PCI 1025 by processing the second setpoint temperature in conjunction with information derived from the historical record (e.g., Global Model G) stored in memory of previous heating and cooling cycles for the HVAC system. As described previously, the thermostat may use the time to temperature ("T2T") algorithm to estimate an amount of temperature that can be overcome in a given amount of time as described in more detail below.

In one embodiment, the set of PCI 1025 is computed by referencing the second setpoint 1024 and stepping backward in time by a first duration 1026, a second duration, a third duration, and the like, where each duration is characterized by adding a defined change in time ΔT 1028 to the subsequent duration (e.g., respectively ΔT, 2*ΔT, 3*ΔT, and the like), or by any other method. Based on the respective durations, the thermostat computes an amount of cooling or temperature change ΔC 1030 that is likely to occur if cooling is performed for each duration. As described previously, the estimated cooling ΔC 1030 is likely to be nonlinear. Thus, the temperature change ΔC 1030 for each duration, or for several durations, is likely to be different. The temperature change ΔC 1030 is determined by querying the T2T algorithm and Global Model G data to estimate a temperature change for the home or enclosure if cooling is performed for the respective duration.

Based on the computed ΔC 1030 for each duration, the thermostat determines a triggering temperature for each duration. For example, using the second setpoint temperature 1024 of approximately 70° Fahrenheit and a defined time change ΔT 1028 of 5 minutes, the first duration 1026 is computed to be 5 minutes, the second duration is computed to be 10 minutes, the third duration is computed to be 15 minutes, and the process is repeated for any additional durations. Using the T2T algorithm and Global Model G data, the thermostat may estimate or compute a first temperature change ΔC for the first duration of approximately 1° Fahrenheit, a second temperature change ΔC for the second duration of approximately 1.5° Fahrenheit, a third temperature change ΔC for the third duration of approximately 3.5° Fahrenheit, and additional temperature changes ΔC for any subsequent durations. The thermostat may then set a triggering temperature of approximately 71° Fahrenheit for the first duration, a triggering temperature of approximately 71.5° Fahrenheit for the second duration, a triggering temperature of approximately 73.5° Fahrenheit for the third duration, and the like.

If the ambient temperature of the home, as measured by the thermostat, rises to or above one of these triggering temperatures within the respective durations from second setpoint time 1024, the HVAC system will be cycled on and preconditioning will occur. For example, FIG. 10B illustrates an ambient temperature reading 1034 at time (i) and a temperature trajectory 1036 for an ambient temperature of the home. At a subsequent time (i.e., i+k) the ambient temperature may rise to or above a triggering temperature 1038 for an $n^{th}$ duration 1039. Triggering temperature 1038 may trigger the HVAC system on to precondition the ambient temperature to near the second setpoint temperature 1024 by the second setpoint time.

Figure 10C:
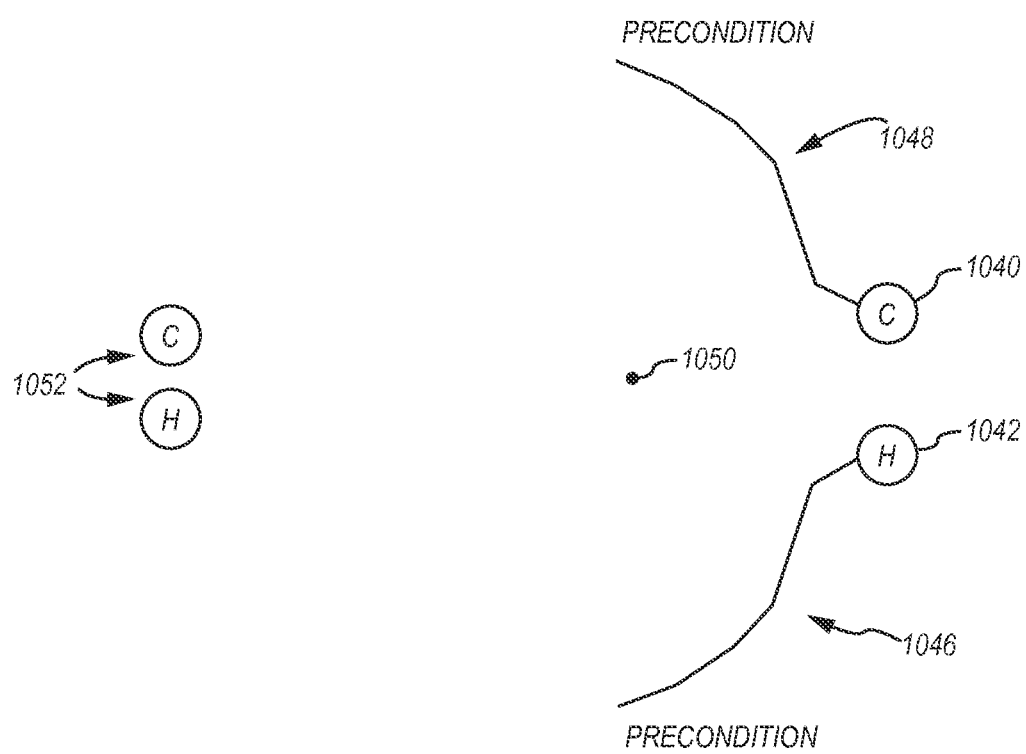
Figure 11:
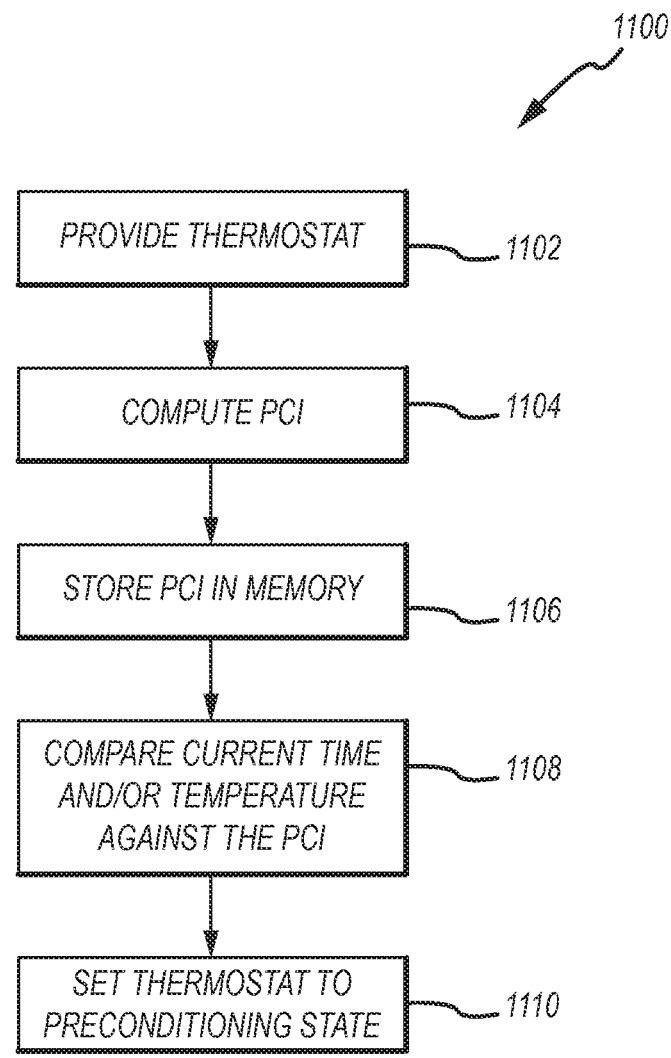
FIG. 11 illustrates a method of preconditioning an enclosure, according to one embodiment.

FIG. 10C illustrates a preconditioning range operation 1040 that is essentially the combination of the preconditioning heating operation 1000 and the preconditioning cooling operation 1020. The process involves computing an upper range of PCI values or information 1048 that represent ambient conditions for which preconditioning cooling should be triggered and computing a lower range of PCI values or information 1046 that represent ambient conditions for which preconditioning heating should be triggered. The process is similar to the previously described processes and, thus, some of the previous description is omitted.

FIG. 10C illustrates a range setpoint that is characterized by a time (not shown) and an upper temperature value 1044 (e.g., 80° Fahrenheit) and a lower temperature value 1042 (e.g., 72° Fahrenheit). A prior range setpoint 1052 may likewise be characterized by be a time, an upper temperature value, and a lower temperature value, and a time interval may exist between the two range setpoints. The thermostat computes the upper range PCI 1048 and lower range PCI 1046 by processing the range setpoint upper and lower temperature values in conjunction with information derived from the historical record (e.g., Global Model G) stored in memory of previous heating and cooling cycles. As described previously, the thermostat may use the time to temperature ("T2T") algorithm to estimate an amount of temperature that can be overcome in a given amount of time as described in more detail below. FIG. 10C illustrates the upper range PCI 1048 and lower range PCI 1046 being curves rather than the above described step functions, although step functions may be used in some embodiments.

As described previously, the upper and lower range PCI, 1048 and 1046 respectively, are computed by referencing the range setpoint time and stepping backward in time by a first duration, a second duration, a third duration, and the like. Based on the respective durations, the thermostat computes an amount of cooling ΔC and heating ΔH that is likely to occur if cooling or heating are performed for each duration. The temperature changes ΔC and ΔH are determined by querying the T2T algorithm and Global Model G data.

Based on the computed ΔC and ΔH for each duration, the thermostat determines respective upper and lower triggering temperatures for each duration. If the ambient temperature of the home as measured by the thermostat rises to or above the upper PCI range values or drops to or below the lower PCI range values, the HVAC system will be cycled on and the appropriate preconditioning operation will occur. For example, FIG. 10C illustrates an ambient temperature reading 1050 at time (i). If at any subsequent time (i.e., i+k) the ambient temperature rises to or above the upper PCI range values or drops to or below the lower PCI range values, the thermostat cycles the HVAC system on and preconditioning is performed so that the ambient temperature remains near one of the range temperature values or therebetween. As described herein, one or more of the durations may be set to an arbitrarily large or small value so that preconditioning will not occur during a system lockout period. In addition, as long as ambient temperature reading 1050 remains between the range temperature values, preconditioning will not occur.

Exemplary Preconditioning Methods

According to one embodiment, a method 1100 of preconditioning an enclosure is provided. According to method 1100, at block 1102, a thermostat is provided. As described herein, the thermostat may include a housing, memory, and a processing system disposed within the housing. The processing system may be in operative communication with one or more temperature sensors, or other sensors, to determine an ambient temperature. The processing system may also be in operative communication with an HVAC system to control the ambient temperature according to an HVAC schedule that is stored in the memory. The HVAC schedule may include a first setpoint characterized by a first setpoint temperature and a first setpoint time and a second setpoint characterized by a second setpoint temperature and a second setpoint time. The first setpoint time and second setpoint time may define a first time interval therebetween.

The processing system may further be configured to control the HVAC system to precondition the enclosure during at least a portion of the first time interval so that preconditioning is performed—i.e., so that the ambient temperature reaches substantially the second setpoint temperature by the second setpoint time. As described herein, the processing system may include a first processor characterized by at least a relatively high electrical power-consuming first mode of operation and a relatively low electrical power-consuming second mode of operation.

At block 1104, a set of preconditioning criteria information (PCI) may be computed, which computation typically occurs during the first time interval—i.e., between the first and second setpoint time. As described herein, the PCI is representative of time and ambient temperature conditions for which preconditioning should be performed. According to one embodiment, the first processor is entered into the first mode of operation (i.e., the relatively high electrical power-consuming mode) to process the second setpoint temperature in conjunction with information that is derived from a historical record stored in the memory of previous heating and cooling cycles for the HVAC system as controlled by the thermostat. The second setpoint temperature and derived information are used to compute the set of PCI.

At block 1106, the set of PCI is stored in the memory, which may be disposed within the thermostat or external thereto (e.g., cloud service and the like). According to some embodiments, the first processor may be entered into the second mode of operation (i.e., the relatively low electrical power-consuming mode) subsequent to storing the set of PCI in the memory. At block 1108, a current time and current ambient temperature are compared against the PCI to determine whether to enter the thermostat into a preconditioning state. In some embodiments, this comparison process occurs while the first processor is in the second mode of operation. Upon a determination that the PCI criteria are satisfied, such as an ambient temperature exceeding a triggering temperature threshold, the first processor may be entered into the first mode of operation and/or the thermostat may be entered into the preconditioning state, as shown at block 1110. As described above, in some embodiments, the set of PCI may include a step function within the first interval of time and measured relative to the second setpoint temperature.

As described herein, the set of PCI is typically computed based on a time to temperature T2T for the conditioned enclosure. The time to temperature T2T estimation may be adjusted for subsequent preconditioning heating or cooling operations based on a response of the enclosure to the preconditioning operation being performed. For example, the response of the enclosure to the preconditioning may be recorded (e.g., the measured change in temperature over an amount of time) and this data may be used to adjust the T2T estimation. In this manner, recent data may replace older data and the T2T estimation may accurately reflect the enclosure's heating or cooling response. This allows the thermostat to adjust to seasonal changes and/or other factors that may affect heating and cooling.

In some embodiments, the processing system includes a second processor that is characterized by a relatively low electrical power-consuming mode of operation. In such embodiments, the set of PCI may be communicated to the second processor prior to the first processor entering into the second mode of operation. In such embodiments, step 1108 of method 1100 may include: determining an "amount of time" relative to the first processor entering into the second mode of operation, determining an ambient temperature condition of the set of PCI associated with the "amount of time" that represents a temperature for which preconditioning should be performed, and comparing the current ambient temperature with the ambient temperature condition to determine whether the set of PCI criteria are satisfied.

In some embodiments, the set of PCI may include an upper step function representative of conditions for which preconditioning cooling should be performed, a lower step function representative of conditions for which preconditioning heating should be performed, or both. In some embodiments, preconditioning could be limited to a defined duration, such as one hour time prior to the second setpoint time.

Figure 12:
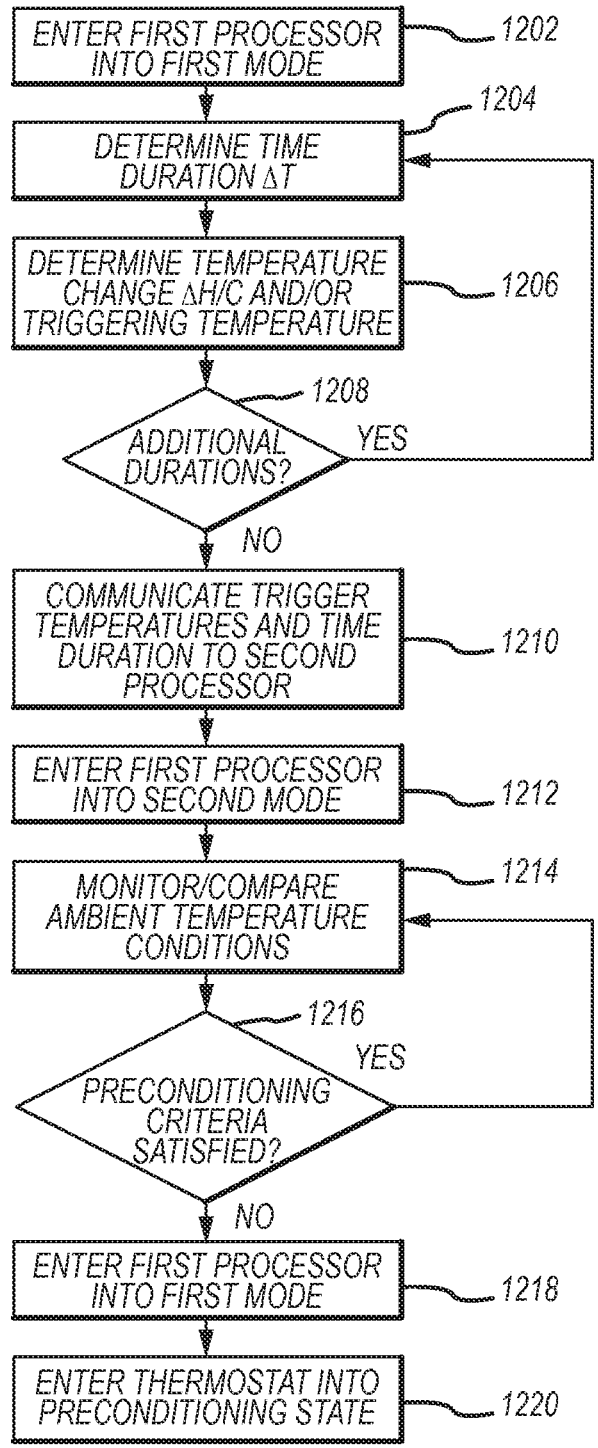
FIG. 12 illustrates another method of preconditioning an enclosure, according to one embodiment.

Referring now to FIG. 12, illustrated is an exemplary method 1200 of preconditioning an enclosure. Method 1200 may use the thermostat, schedule, setpoint temperatures and times, and the like described herein. According to method 1200, at block 1202 a first processor of a thermostat is entered into a first mode of operation, the first mode of operation being a relatively high power-consuming mode (i.e., an active or awake mode). Blocks 1204 and 1206 describe how preconditioning criteria information (PCI) is calculated, which process is typically performed by the first processor while the first processor is in the first mode of operation. At block 1204, a time duration ΔT from a setpoint time is determined. At block 1206, a temperature change ΔH or ΔC and/or a triggering temperature are determined for the time duration ΔT. At block 1208, a determination is made as to whether additional time durations are necessary or required for the PCI. If additional time durations are necessary or required, blocks 1204 and 1206 are repeated until no additional time durations are needed.

If additional time durations are not necessary or required, the process continues to block 1210 where the trigger temperature(s) and time duration(s) are communicated to a second low power-consuming processor of the thermostat. According to some embodiments, communicating this information to the second processor may include storing the information in memory that is accessible by the second processor. In other embodiments, the information may be communicated to the second processor. The first processor may communicate this information to the second processor and/or store the information in memory. At block 1212, subsequent to communicating the information to the second processor, the first processor is entered into a second mode of operation, the second mode of operation being a relatively low power-consuming mode (i.e., a sleep mode).

At block 1214, the second processor monitors ambient temperature conditions of the enclosure and compares the ambient temperature conditions against the PCI, such as by comparing the ambient temperature conditions to a trigger temperature. At block 1216, a determination is made about whether the PCI's preconditioning criteria are satisfied, such as if the current ambient temperature exceeds the trigger temperature threshold. If the PCI's preconditioning criteria are not satisfied, the monitoring and comparing process continues at block 1214. If the PCI's preconditioning criteria are satisfied, the process continues to block 1218, where the first processor is entered into the first mode of operation, such as by being woken up by the second processor. At block 1220, the thermostat is entered into a preconditioning state in order to instruct the HVAC system to being a heating or cooling operation.

Figure 13:
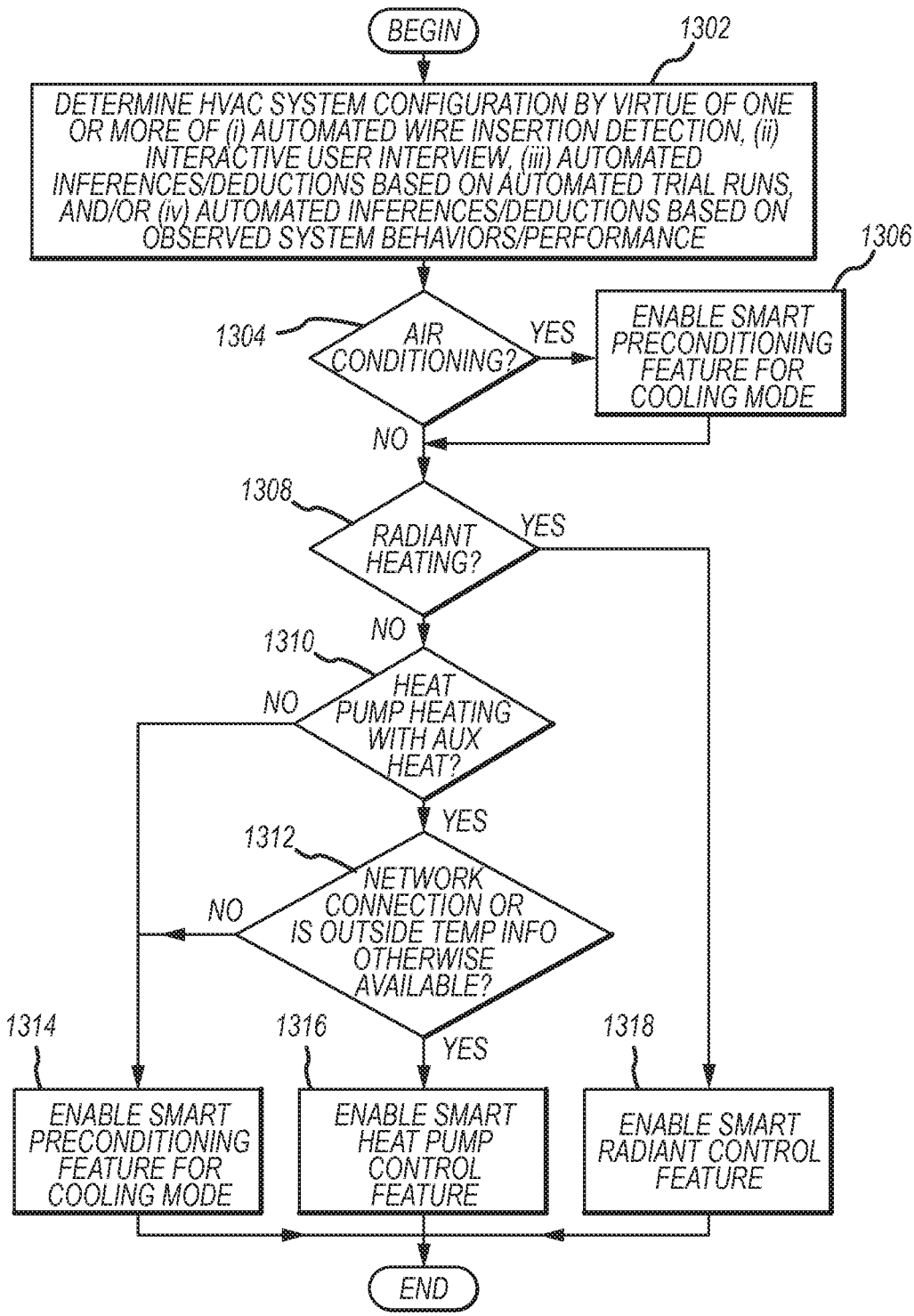
FIG. 13 illustrates steps for automated system matching, according to one embodiment.

FIG. 13 illustrates steps for automated system matching that are preferably carried out by the same thermostat or thermostatic control system that carries out one or more of the other HVAC control methods that are described in the instant patent specification. It has been found particularly desirable to make thermostat setup and governance as user-friendly as possible by judiciously automating the selection of which among a variety of available energy-saving and comfort-promoting control algorithms are appropriate for the particular HVAC configuration of the home in which the thermostat is installed. At step 1302, the HVAC system features available for control by the thermostat are determined by virtue of at least one of (i) automated wire insertion detection, (ii) interactive user interview, (iii) automated inferences or deductions based on automated trial runs of the HVAC system at or near the time of thermostat installation, and (iv) automated inferences or deductions based on observed system behaviors or performance. Examples of such methods are described in one or more of the commonly assigned US20120130679A1 and US20120203379A1, each of which are incorporated by reference herein, as well as U.S. Ser. No. 13/632,148, supra.

In relation to cooling mode operation, if it is determined that the HVAC system includes air conditioning (step 1304), which may be by virtue of a dedicated air conditioning system and/or a heat pump operating in the cooling direction, then at step 1306 there is enabled a smart preconditioning feature for cooling mode operation. One example of a particularly advantageous smart preconditioning feature is described herein. For some embodiments, the smart preconditioning algorithm is configured to: constantly learn how fast the home heats up or cools down by monitoring the recent heating and cooling history of the home, optionally incorporating external environmental information such as outside temperatures, sun heating effects, etc.; predict how long the HVAC system will need to actively heat or cool in order to reach a particular scheduled setpoint; and begin preconditioning toward the particular scheduled setpoint at just the right time such that the scheduled setpoint temperature will be reached at the scheduled setpoint time. User comfort is promoted by virtue of not reaching the scheduled setpoint temperature too late, while energy savings is promoted by virtue of not reaching the scheduled setpoint temperature too early.

In relation to heating mode operation, if it is determined that the HVAC system includes radiant heating (step 1308), then at step 1318 there is enabled a smart radiant control feature for heating mode operation. One example of a particularly advantageous smart radiant control feature is described U.S. Ser. No. 13/632,152, supra. For some embodiments, the smart radiant control feature is configured to monitor radiant heating cycles on an ongoing basis, compute an estimated thermal model of the home as heated by the radiant system, and predicatively control the radiant system in a manner that takes into account the thermal model of the house, the time of day, and the previous heat cycle information. The smart radiant control feature is configured to achieve comfortable maintenance band temperatures while also minimizing frequent changes in HVAC on/off states and minimizing HVAC energy consumption. Among other advantages, uncomfortable and energy-wasting target temperature overshoots are avoided.

If it is determined that the HVAC system includes a heat pump including auxiliary resistive electrical heating (i.e., so-called auxiliary or AUX heat) (step 1310), and if it is further determined (step 1312) that the thermostat is network-connected (such that it can receive outside temperature information based on location data and an internet-based temperature information source) or otherwise has access to outside temperature information (such as by wired or wireless connection to an outside temperature sensor), then at step 1316 a smart heat pump control feature is enabled. If at step 1310 there is not a heat pump with AUX heat (which will most commonly be because there is a conventional gas furnace instead of a heat pump, or else because there is a heat pump in a so-called dual-fuel system that does not include AUX heat), then at step 1314 there is enabled a smart preconditioning feature for heat mode, which can be a similar or identical opposing counterpart to the preconditioning feature for cooling mode discussed supra with respect to step 1306. Similarly, if at step 1312 there is no network connectivity or other access to outside temperature information, then the smart heat pump control feature of step 1316 is not enabled and instead the smart preconditioning feature of step 1314 is enabled.

In reference to step 1316, one example of a particularly advantageous smart heat pump control feature is described in the commonly assigned U.S. Ser. No. 13/632,093, supra. Although the AUX heat function allows for faster heating of the home, which can be particularly useful at lower outside temperatures at which heat pump compressors alone are of lesser efficacy, the energy costs of using AUX heat can often be two to five times as high as the energy costs of using the heat pump alone. For some embodiments, the smart heat pump control feature is configured to monitor heat pump heating cycles on an ongoing basis, tracking how fast the home is heated (for example, in units of degrees F. per hour) by the heat pump compressor alone in view of the associated outside air temperatures. Based on computed correlations between effective heating rates and outside air temperatures, and further including a user preference setting in a range from "Max Comfort" to "Max Savings" (including a "Balanced" selection in between these end points), the smart heat pump control feature judiciously activates the AUX heating function in a manner that achieves an appropriate balance between user comfort and AUX heating costs. For some embodiments, the factors affecting the judicious invocation of AUX heat include (i) a predicted amount of time needed for the heat pump alone to achieve the current temperature setpoint, (ii) whether the current temperature setpoint resulted from an immediate user control input versus whether it was a scheduled temperature setpoint, and (iii) the particular selected user preference within the "Max Comfort" to "Max Savings" range. Generally speaking, the AUX function determination will be more favorable to invoking AUX heat as the compressor-alone time estimate increases, more favorable to invoking AUX heat for immediate user control inputs versus scheduled setpoints, and more favorable to invoking AUX heat for "Max Comfort" directed preferences than for "Max Savings" directed preferences.

For some embodiments, the smart heat pump control feature further provides for automated adjustment of a so-called AUX lockout temperature, which corresponds to an outside air temperature above which the AUX heat will never be turned on, based on the monitored heat pump heating cycle information and the user preference between "Max Comfort" and "Max Savings." Generally speaking, the AUX lockout temperatures will be lower (leading to less AUX usage) for better-performing heat pumps, and will also be lower (leading to less AUX usage) as the user preference tends toward "Max Savings". For some embodiments in which there is network connectivity available such that overnight temperature forecasts can be provided, the smart heat pump control feature further provides for night time temperature economization in which an overnight setpoint temperature may be raised higher than a normally scheduled overnight setpoint if, based on the overnight temperature forecast, the AUX function would be required to reach a morning setpoint temperature from the normal overnight setpoint temperature when morning comes. Advantageously, in such situations, even though the overnight temperature inside the home is made higher it would otherwise be, the user actually saves energy and money by avoiding the use of the AUX function when morning comes.

According to some embodiments, the determinations made at one or more of steps 1308 and 1310 can be based on automatically observed HVAC system performance information rather than specific system identification information. For example, it may be the case that a particular heating functionality of an HVAC system is not physically a radiant system, but nevertheless tends to exhibit signs of a high thermal mass combined with substantial control lag, making it similar in nature to a radiant heating system. For such cases, the smart radiant control feature may be enabled to improve performance. Likewise, it may not be the case that the HVAC system has a heat pump with AUX functionality, but it may have a two-stage heating functionality in which the first stage (which type was likely chosen as a first stage because it was more cost-effective) tends to be very slow or "fall behind" at lower outside temperatures, and in which the second stage (which type was likely chosen as a second stage because it was less cost-effective) tends to be very time-effective in heating up the home, thus making the system act very much like a heat pump system with AUX functionality. For such cases, the smart heat pump control feature may be enabled to improve performance.

Although embodiments of the invention have been generally directed toward controls for HVAC systems, it should be realized that the concepts described herein are not limited to these specific embodiments and can be used for other purposes. For example, the preconditioning information described herein (i.e., how quickly a home heats or cools and/or how often heating or cooling is required) may be collected on a neighborhood-wide, community-wide, city-wide, and the like basis and used for various purposes. For example, the information may be provided to home manufacturers to demonstrate the usefulness or effectiveness of specific insulation materials. The data may reveal that certain insulation material are more effective in specific regions and/or demonstrate that certain installation techniques are more effective. The data may further demonstrate an HVAC systems effectiveness and/or environmental impact.

Aggregated preconditioning information may likewise be provided to manufacturers for research and development purposes to enable these manufacturers to produce better quality materials and/or equipment. This information may also help manufacturers determine if various material and equipment combinations (e.g., thermostat system and insulation combinations) have synergistic insulating effects. Similarly, the aggregated preconditioning information may also be provided to public services for various management purposes, such as identifying high energy usage areas and planning accordingly.

In other instances, the aggregated information may be provided to online real estate databases and included within profiles of listed homes. For example, home buyers may be provided with highly accurate information about how the home is insulated, which may allow the buyers to accurately estimate energy usage and associated costs. This data may also allow buyers to identify how "green" the home is, which may affect a buyer's ultimate decision. In some embodiments, improvements or upgrades to the home, such as the inclusion of insulative windows, may be tracked and data may be gathered about the effects such improvement or upgrades provide. The data may be provided to various entities, such as those described previously, and used for various purposes. For example, city, state, and/or federal governments may use this information in designing energy related legislation to encourage home owners to upgrade existing homes to include materials and/or equipment demonstrated to be effective.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. An HVAC control device comprising:
a processing system that receives ambient temperature information for an enclosure and information from an HVAC schedule, the HVAC schedule including a first setpoint characterized by a first setpoint temperature and a first setpoint time, the HVAC schedule including a second setpoint characterized by a second setpoint temperature and a second setpoint time, the first setpoint time and second setpoint time defining a first time interval therebetween, said processing system being configured to control the HVAC system to precondition the enclosure during at least a part of said first time interval such that the ambient temperature reaches substantially said second setpoint temperature by said second setpoint time, wherein the processing system controls the HVAC system to precondition the enclosure by:
processing the second setpoint temperature in conjunction with first information derived from a historical record of previous heating and cooling cycles for said HVAC system as controlled by the HVAC control device to compute a set of preconditioning criteria information (PCI) representative of time and ambient temperature conditions for which the preconditioning should be performed;
during said time interval, comparing a current time and current ambient temperature against said PCI to determine whether to enter into a preconditioning state; and
when it is so determined, entering into said preconditioning state upon a determination that the PCI criteria are satisfied.

2. The HVAC control device of claim 1, wherein the set of PCI is computed based on a time to temperature for the enclosure that defines a change in temperature response for the enclosure when subjected to a heating or cooling operation.

3. The HVAC control device of claim 2, wherein the time to temperature for the enclosure is adjusted for a subsequent preconditioning operation based on a response of the enclosure to said preconditioning, said response being included in said historical record of said previous heating and cooling cycles.

4. The HVAC control device of claim 1, wherein the processing system comprises:
a first processor characterized by at least a relatively high electrical power-consuming first mode of operation and a relatively low electrical power-consuming second mode of operation, wherein said processing is performed by said first processor; and
a second processor characterized by a relatively low electrical power-consuming mode of operation, wherein said comparing is performed by said second processor.

5. The HVAC control device of claim 4, wherein said set of PCI is computed via said first processor, and wherein said set of PCI is communicated to said second processor for comparing said current time and current ambient temperature against said PCI.

6. The HVAC control device of claim 5, wherein communicating said set of PCI to said second processor comprises communicating a partial set of said set of PCI, said partial set covering a time interval extending to either of: 1) an anticipated or requested time of said first processor entering into said first mode of operation, and 2) said second setpoint time.

7. The HVAC control device of claim 4, wherein comparing said current time and current ambient temperature against said PCI to determine whether to enter into said preconditioning state comprises:
determining an amount of time relative to said first processor entering into said second mode of operation;
determining an ambient temperature condition of said PCI associated with said amount of time, the ambient temperature condition representing a temperature for which preconditioning should be performed; and
comparing said current ambient temperature with said ambient temperature condition to determine whether said PCI criteria are satisfied.

8. The HVAC control device of claim 4, wherein processing said second setpoint temperature in conjunction with said first information to compute said set of PCI comprises:
  determining a first time duration defined by said second setpoint time and a first time within said first time interval;
  deriving from said historical record, a first ambient temperature condition associated with said first time duration that represents a temperature for which preconditioning should be performed;
  determining a second time duration defined by said first time and a second time within said first time interval;
  deriving from said historical record, a second ambient temperature condition associated with said second time duration that represents an additional temperature for which preconditioning should be performed; and
  determining at least one addition time duration within said first time interval; and
  deriving at least one additional ambient temperature condition representative of at least one additional temperature for which preconditioning should be performed.

9. The HVAC control device of claim 1, wherein said set of PCI comprises either or both an upper range representative of conditions for which preconditioning cooling should be performed and a lower range representative of conditions for which preconditioning heating should be performed.

10. The HVAC control device of claim 1, wherein said set of PCI comprise a step function, and wherein preconditioning is limited to a defined duration.

11. A method comprising:
  providing an HVAC control device comprising:
  a processing system that receives ambient temperature information for an enclosure and information from an HVAC schedule, the HVAC schedule including a first setpoint characterized by a first setpoint temperature and a first setpoint time, the HVAC schedule including a second setpoint characterized by a second setpoint temperature and a second setpoint time, the first setpoint time and second setpoint time defining a first time interval therebetween, said processing system being configured to control the HVAC system to precondition the enclosure during at least a part of said first time interval such that the ambient temperature reaches substantially said second setpoint temperature by said second setpoint time;
  processing the second setpoint temperature in conjunction with first information derived from a historical record stored of previous heating and cooling cycles for said HVAC system as controlled by said HVAC control device to compute a set of preconditioning criteria information (PCI) representative of time and ambient temperature conditions for which the preconditioning should be performed;
  during said time interval, comparing a current time and current ambient temperature against said PCI to determine whether to enter said HVAC control device into a preconditioning state; and
  entering said HVAC control device into said preconditioning state upon a determination that the PCI criteria are satisfied.

12. The method of claim 11, wherein said set of PCI is computed based on a time to temperature for said enclosure.

13. The method of claim 12, wherein said time to temperature is adjusted for a subsequent preconditioning operation based on a response of said enclosure to said preconditioning.

14. The method of claim 11, wherein said processing system comprises:
  a first processor characterized by at least a relatively high electrical power-consuming first mode of operation and a relatively low electrical power-consuming second mode of operation, wherein said processing is performed by said first processor; and
  a second processor characterized by a relatively low electrical power-consuming mode of operation, wherein said comparing is performed by said second processor.

15. The method of claim 14, wherein comparing said current time and current ambient temperature against said set of PCI to determine whether to enter into said preconditioning state comprises:
  determining an amount of time relative to said first processor entering into said second mode of operation;
  determining an ambient temperature condition of said set of PCI associated with said amount of time, said ambient temperature condition representing a temperature for which preconditioning should be performed; and
  comparing said current ambient temperature with said ambient temperature condition to determine whether said set of PCI criteria are satisfied.

16. The method of claim 14, wherein said set of PCI comprises a step function within said first interval of time.

17. The method of claim 16, wherein said set of PCI comprises either or both an upper step function representative of conditions for which preconditioning cooling should be performed and a lower step function representative of conditions for which preconditioning heating should be performed.

18. The method of claim 11, wherein preconditioning is limited to being performed up to one hour prior to the second setpoint time.

19. An HVAC control device comprising:
  a processing system that receives ambient temperature information of an enclosure and information from an HVAC schedule, the HVAC schedule including a first setpoint characterized by a first setpoint temperature and a first setpoint time, the HVAC schedule including a second setpoint characterized by a second setpoint temperature and a second setpoint time, the first setpoint time and second setpoint time defining a first time interval therebetween, the processing system being configured to control the HVAC system to precondition the enclosure during at least a part of the first time interval such that the ambient temperature reaches substantially the second setpoint temperature by the second setpoint time, the processing system including a first relatively high power processor and a second relatively low power processor, wherein the processing system controls the HVAC system to preconditioning the enclosure by:
  processing, via the first processor, the second setpoint temperature in conjunction with first information derived from a historical record of previous heating and cooling cycles for the HVAC system as controlled by the HVAC control device to compute a set of preconditioning criteria information (PCI) representative of time and ambient temperature conditions for which the preconditioning should be performed;
  communicating the set of PCI to the second processor;

comparing, via the second processor, a current time and current ambient temperature against the set of PCI to determine whether to enter into a preconditioning state; and entering the HVAC control device into the preconditioning state upon a determination that the PCI criteria are satisfied.

20. The HVAC control device of claim 19, wherein the set of PCI is computed based on a time to temperature for the enclosure that defines a change in temperature in a defined amount of time for the enclosure when subjected to a heating or cooling operation.

21. The HVAC control device of claim 19, wherein comparing the current time and current ambient temperature against the set of PCI comprises:

determining, via the second processor, an ambient temperature condition representing a temperature for which preconditioning should be performed; and comparing, via the second processor, the current ambient temperature with the ambient temperature condition to determine whether the set of PCI criteria are satisfied.

22. The HVAC control device of claim 19, wherein processing the second setpoint temperature in conjunction with the first information to compute the set of PCI comprises:

calculating a step function having a plurality of time durations and a plurality of ambient temperature conditions, wherein each time duration is associated with a respective ambient temperature condition, and wherein the step function is calculated by:

determining the plurality of time durations, wherein each time duration is defined by a first time and a second time within the first time interval and measured relative to the second setpoint time; and deriving from the historical record and for each time duration, an ambient temperature condition that represents a temperature for which preconditioning should be performed.

23. The HVAC control device of claim 19, wherein the set of PCI comprises either or both an upper range representative of conditions for which preconditioning cooling should be performed and a lower range representative of conditions for which preconditioning heating should be performed.

24. A method comprising:

providing an HVAC control device comprising:

a processing system that receives ambient temperature information for an enclosure and information from an HVAC schedule for the enclosure, the HVAC schedule including a first setpoint characterized by a first setpoint temperature and a first setpoint time, the HVAC schedule including a second setpoint characterized by a second setpoint temperature and a second setpoint time, the first setpoint time and second setpoint time defining a first time interval therebetween, the processing system being configured to control the HVAC system to precondition the enclosure during at least a part of said first time interval such that the ambient temperature reaches substantially the second setpoint temperature by the second setpoint time, the processing system including a first relatively high power processor and a second relatively low power processor;

processing, via the first processor, the second setpoint temperature in conjunction with first information derived from a historical record of previous heating and cooling cycles for the HVAC system as controlled by the HVAC control device to compute a set of preconditioning criteria information (PCI) representative of time and ambient temperature conditions for which the preconditioning should be performed;

communicating the set of PCI to the second processor;

comparing, via the second processor, a current time and current ambient temperature against the set of PCI to determine whether to enter the HVAC control device into a preconditioning state; and entering the HVAC control device into the preconditioning state upon a determination that the PCI criteria are satisfied.

25. The method of claim 24, wherein the set of PCI is computed based on a time to temperature for the enclosure.

26. The method of claim 25, wherein the time to temperature is adjusted for a subsequent preconditioning operation based on a response of the enclosure to the preconditioning.

27. The method of claim 24, wherein the set of PCI comprises a step function within the first interval of time.

28. The method of claim 27, wherein the set of PCI comprises either or both an upper step function representative of conditions for which preconditioning cooling should be performed and a lower step function representative of conditions for which preconditioning heating should be performed.

* * * * *